US011159956B2

(12) United States Patent
Zhou et al.

(10) Patent No.: US 11,159,956 B2
(45) Date of Patent: Oct. 26, 2021

(54) UPLINK BEAM MANAGEMENT IN WIRELESS COMMUNICATION SYSTEM

(71) Applicant: Ofinno, LLC, Reston, VA (US)

(72) Inventors: Hua Zhou, Herndon, VA (US); Esmael Dinan, McLean, VA (US); Kyungmin Park, Vienna, VA (US); Ali Cagatay Cirik, Herndon, VA (US); Hyoungsuk Jeon, Centreville, VA (US); Yunjung Yi, Vienna, VA (US); Alireza Babaei, Fairfax, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 11 days.

(21) Appl. No.: 16/834,019

(22) Filed: Mar. 30, 2020

(65) Prior Publication Data

US 2020/0314664 A1  Oct. 1, 2020

Related U.S. Application Data

(60) Provisional application No. 62/825,587, filed on Mar. 28, 2019.

(51) Int. Cl.
*H04L 5/00* (2006.01)
*H04B 7/06* (2006.01)
(Continued)

(52) U.S. Cl.
CPC .......... *H04W 16/28* (2013.01); *H04B 7/0617* (2013.01); *H04B 7/0626* (2013.01); *H04L 5/0051* (2013.01); *H04L 25/0226* (2013.01); *H04W 56/001* (2013.01); *H04W 72/042* (2013.01); *H04W 74/0833* (2013.01)

(58) Field of Classification Search
CPC .............. H04W 16/28; H04W 72/042; H04W 74/0833; H04B 7/0617; H04B 7/0626; G04L 5/0051; H04L 25/0226
See application file for complete search history.

(56) References Cited

U.S. PATENT DOCUMENTS

2019/0190582 A1\* 6/2019 Guo ................. H04B 7/0695
2019/0261338 A1\* 8/2019 Akkarakaran ...... H04W 72/046
(Continued)

OTHER PUBLICATIONS

3GPP TS 38.212 V15.4.0 (Dec. 2018); Technical Specification; 3rd Generation Partnership Project; Technical Specification Group Radio Access Network; NR; Multiplexing and channel coding; (Release 15).

(Continued)

*Primary Examiner* — Jaison Joseph
(74) *Attorney, Agent, or Firm* — Kavon Nasabzadeh; Philip Smith; Willis H. Chang

(57) ABSTRACT

A wireless device receives configuration parameters comprising first parameters of downlink RSs and second parameter indicating that a default beam is used for uplink transmission. A DCI indicating a first uplink transmission via a PUSCH resource is received. A spatial relation information, for the first uplink transmission, is determined to be associated with one of the downlink reference signals in response to the second parameter indicating that the default beam is used. A transport block is transmitted via the PUSCH resource according to the spatial relation information.

20 Claims, 33 Drawing Sheets

(51) Int. Cl.
  *H04W 16/28* (2009.01)
  *H04W 72/04* (2009.01)
  *H04L 25/02* (2006.01)
  *H04W 56/00* (2009.01)
  *H04W 74/08* (2009.01)

(56) References Cited

U.S. PATENT DOCUMENTS

| | | | |
|---|---|---|---|
| 2019/0289588 | A1 | 9/2019 | Akkarakaran et al. |
| 2019/0312698 | A1* | 10/2019 | Akkarakaran ........ H04L 5/0091 |
| 2019/0319823 | A1* | 10/2019 | Akkarakaran ........ H04B 7/0408 |
| 2020/0195334 | A1* | 6/2020 | Zhou ....................... H04L 5/005 |
| 2020/0196277 | A1* | 6/2020 | Zhou ...................... H04B 7/088 |
| 2020/0229098 | A1* | 7/2020 | Cheng ................. H04W 72/042 |
| 2020/0305168 | A1* | 9/2020 | Liou ..................... H04L 5/0053 |

OTHER PUBLICATIONS

"3GPP TS 38.213 V15.4.0 (Dec. 2018); Technical Specification; 3rd Generation Partnership Project; Technical Specification Group Radio Access Network; NR;Physical layer procedures for control (Release 15); / /".

3GPP TS 38.214 V15.4.0 (Dec. 2018); Technical Specification; 3rd Generation Partnership Project; Technical Specification Group Radio Access Network; NR; Physical layer procedures for data; (Release 15).

3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).

"R1-1805574 Feature lead summary 2 on beam management v2; 3GPP TSG RAN WG1 Meeting #92b; Sanya, China, Apr. 16-20, 2018;; ; Source:Ericsson; Title:Feature lead summary 2 on beam measurement and reporting."

"R1-1901205 UL beam selection improvements; 3GPP TSG RAN WG1 Ad-Hoc Meeting 1901Tdoc ; Taipei, Taiwan, Jan. 21-25, 2019; ; Agenda Item:7.2.8.6; Source:Ericsson; Title:UL beam selection improvements."

"R1-1901568; 3GPP TSG RAN WG1 Meeting #96; Athens, Greece, Feb. 25-Mar. 1, 2019; ; Agenda Item:7.2.8.3; Source:Huawei, HiSilicon; Title: Enhancements on multi-beam operation."

"R1-1901635 Enhancements on Multi-beam Operation; 3GPP TSG RAN WG1 Meeting #96 ; Athens, Greece, Feb. 25-Mar. 1, 2019; Source:ZTE; Title: Enhancements on multi-beam operation; Agenda Item: 7.2.8.3; Document for: Discussion and Decision."

"R1-1901639 Additional considerations on beam management for multi-TRP; 3GPP TSG RAN WG1 #96; Athens, Greece, Feb. 25-Mar. 1, 2019; ; Source: ZTE; Title:Additional considerations on beam management for multi-TRP; Agenda item:7.2_8.6."

"R1-1901640 Additional details of latency and overhead reduction for beam; 3GPP TSG RAN WG1 #96 ; Athens, Greece, Feb. 25-Mar. 1, 2019; ; Source: ZTE; Title: Additional details of latency and overhead reduction for beam management; Agenda item: 7.2. 8.6."

"R1-1901641 Details and evaluation on UL simultaneous transmission for multi-panel operation; 3GPP TSG RAN WG1 Meeting #96 ; Athens, Greece, Feb. 25-Mar. 1, 2019 ; Source: ZTE; Title:Details and evaluation on UL simultaneous transmission for multi-panel operation; Agenda Item:7.2.8.6; Document for: Discussion and Decision."

"R1-1901642 Details and evaluation on L1-SINR measurement and reporting; 3GPP TSG RAN WG1 Meeting #96; Athens, Greece, Feb. 25-Mar. 1, 2019; Source: ZTE; Title:Details and evaluation on L1-SINR measurement and reporting; Agenda Item:7.2.8.6; Document for: Discussion and Decision."

"R1-1901643 Discussion on UL power control for multi-panel operation; 3GPP TSG RAN WG1 Meeting #96; Athens, Greece, Feb. 25-Mar. 1, 2019; Source:ZTE; Title:Discussion on Ul power control for multi-panel Dperation; Agenda Item:7.2.8.6; Document for:Discussion and Decision."

"R1-1901703_Further discussion on multi-beam operation; 3GPP TSG RAN WG1 Meeting #96; Athens, Greece, Feb. 25-Mar. 1, 2019; ; Source:vivo; Title:Further discussion on Multi-Beam Operation; Agenda Item:7.2.8.3."

"R1-1901779 Discussion on NR mobility enhancements in physical layer; 3GPP TSG RAN WG1 Meeting #96 ; Athens, Greece, Feb. 25-Mar. 1, 2019; Source:ZTE; Title: Discussion on NR Mobility Enhancements in Physical Layer; Agenda Item:7.2.12.1; Document for: Discussion and Decision."

"R1-1901790 beam final; 3GPP TSG RAN WG1 Meeting #96 ; Athens, Greece, Feb. 25-Mar. 1, 2019; ; Agenda Item: 7.2.8.3; Source: MediaTek Inc.; Title:Enhancements on multi-beam operations."

"R1-1901904 Enhancements on Multi-beam Operation; 3GPP TSG RAN WG1 Meeting #96 ; Athens, Greece, Feb. 25-Mar. 1, 2019; Agenda Item:7.2.8.3; Source:AT&T; Title:Enhancements on Multi Beam Operation ; Document for:Discussion/Approval."

"R1-1902020; 3GPP TSG RAN WG1 Meeting #96R1-190200 Athens, Greece, Feb. 25-Mar. 1, 2019; ; Source:CATT; Title:Enhancements on multi-beam operation; Agenda Item:7.2.8.3."

"R1-1902092 Multi-beam_final; 3GPP TSG RAN WG1 Meeting #96; Athens, Greece, Feb. 25-Mar. 1, 2019; Agenda item: 7.2.8.3; Source: LG Electronics; Title: Discussion on multi-beam based operations and enhancements; Document for Discussion and Decision."

"R1-1902162_multi_beam_final; 3GPP TSG RAN WG1 #96; Athens, Greece, Feb. 25-Mar. 1, 2019; ; Agenda Item:7.2.8.3; Source:Lenovo, Motorola Mobility; Title: Discussion of multibeam operation."

"R1-1902184 Enhancements on multi-beam operation; 3GPP TSG RAN WG1 #96; Athens, Greece, Feb. 25-Mar. 1, 2019; ; Agenda Item:7.2.8.3; Source:Sony; Title:Enhancements on multi-beam operation."

"R1-1902249 NR eMob; 3GPP TSG RAN WG1 #96; Athens, Greece, Feb. 25-Mar. 1, 2019; Agenda item:7.2.12; Source:Samsung; Title:Physical Layer Aspects for Mobility Enhancements ; Document for:Discussion and decision."

"R1-1902339; 3GPP TSG RAN WG1 #96 ; Athens, Greece, Feb. 25-Mar. 1, 2019; Agenda item:7.2.8.3; Source: CMCC; Title: Enhancements on multi-beam operation; Document for:Discussion and Decision."

"R1-1902408 Enhancements on UL Multi-beam Operation; 3GPP TSG-RAN WG1 Meeting #96; Athens, Greece, Feb. 25-Mar. 1, 2019; ; Source: Asia Pacific Telecom; Title: Enhancements on UL Multi-beam Operation ; Agenda item:7.2.8.3."

"R1-1902463 Intel NR e-mobilty; 3GPP TSG RAN WG1 Meeting #96; Athens, Greece, Feb. 25-Mar. 1, 2019; ; Source: Intel Corporation ; Title:Physical layer aspects of enhanced mobility; Agenda item:7.2.12.1."

"R1-1902523_Panasonic_NR_MIMO_multi_beam_enhancements_vfinal; 3GPP TSG RAN WG1 #96; Athens, Greece, Feb. 25-Mar. 1, 2019; ; Source:Panasonic; Title: On enhancements for multi-beam operations for NR MIMO in Rel. 16; Agenda Item: 7.2.8.3."

"R1-1902528 Lower-layer mobility enhancements; 3GPP TSG-RAN WG1 Meeting #96Tdoc ; Athens, Greece, Feb. 25-Mar. 1, 2019; ; Agenda Item:7.2.12.1; Source:Ericsson; Title:Lower-layer mobility enhancements."

"R1-1902564; 3GPP TSG RAN WG1 Meeting #96 ; Athens, Greece, Feb. 25-Mar. 1, 2019; ; Agenda item:7.2.8.3; Source:Nokia, Nokia Shanghai Bell; Title: Enhancements on Multi-beam Operation."

"R1-1902615 Enhancement for Multi-Beam Uplink Operation; 3GPP TSG RAN WG1 #96; Athens, Greece, Feb. 25-Mar. 1, 2019; ; Agenda Item:7.2.8.3; Source:InterDigital, Inc.; Title:Enhancement for Multi-Beam Uplink Operation."

"R1-1902630; 3GPP TSG RAN WG1 #96; Athens, Greece, Feb. 25-Mar. 1, 2019; ; Agenda item:7.2.8.3; Source:China Telecom; Title:Enhancements on multi-beam operation for multi-panel transmission."

(56) References Cited

OTHER PUBLICATIONS

"R1-1902714_Discussion on multi-beam operation; 3GPP TSG RAN WG1 #96; Athens, Greece, Feb. 25-Mar. 1, 2019; Agenda Item: 7.2.8.3; Source:Spreadtrum Communications; Title:Discussion on multi-beam operation; Document for:Discussion and decision."

"R1-1902768 Consideration on beam measurement and reporting enhancement; 3GPP TSG RAN WG1 #96; Athens, Greece, Feb. 25-Mar. 1, 2019; ; Agenda Item:7.2.8.3; Source:Apple Inc.; Title:Consideration on beam measurement and reporting enhancement."

"R1-1902833-RAN1#96_multibeam_A; 3GPP TSG RAN WG1 Meeting #96 R1-1902833 Athens, Greece, Feb. 25-Mar. 1, 2019; ; Source:Mitsubishi Electric; Title:Views on multi-beam operation; Agenda Item:7.2.8.3Enhancements on Multi-beam Operation."

"R1-1902866 beam; 3GPP TSG RAN WG1 #96 ; Athens, Greece, Feb. 25-Mar. 1, 2019 ; ; Agenda Item:7.2.8.3; Source:Xiaomi ; Title: Enhancements on beam management."

"R1-1903024 On Mobility Enhancements during HO; 3GPP TSG-RAN WG1 Meeting 1901 ; Athens, Greece, Feb. 25-Mar. 1, 2019; ; Agenda item:7.2.12.1; Source: Qualcomm Incorporated; Title: On Mobility Enhancements during HO."

"R1-1903091; 3GPP TSG RAN WG1 Meeting #96; Athens, Greece, Feb. 25-Mar. 1, 2019; ; Agenda Item:7.2.8.6; Source:Huawei, HiSilicon; Title:Panel-based UL beam selection."

"R1-1903113; 3GPP TSG RAN WG1 Meeting #96; Athens, Greece,Feb. 25-Mar. 1, 2019; ; Agenda Item:7.2.12.1; Source:Huawei, HiSilicon; Title:Overview on NR mobility enhancements."

"R1-1903114; 3GPP TSG RAN WG1 Meeting #96 ; Athens, Greece, Feb. 25-Mar. 1, 2019; ; Agenda Item:7.2.12.2; Source:Huawei, HiSilicon; Title:Discussion on scenarios for mobility enhancements."

"R1-1903115; 3GPP TSG RAN WG1 Meeting #96; Athens, Greece, Feb. 25-Mar. 1, 2019; ; Agenda Item:7.2.12.2; Source:Huawei, HiSilicon; Title:Details on mobility enhancements."

"R1-1903138; 3GPP TSG RAN WG1 Meeting #96; Athens, Greece, Feb. 25-Mar. 1, 2019; ; Agenda item:7.2.12.1; Source:Nokia, Nokia Shanghai Bell; Title:On mobility enhancements during cell change."

"R1-1903231 Enhancements to multi-beam operation; 3GPP TSG-RAN WG1 Meeting #96Tdoc ; Athens, Greece, Feb. 25-Mar. 1, 2019; ; Agenda Item:7.2.8.3; Source:Ericsson; Title:Enhancements to multi-beam operation."

"R2-1900280; 3GPP TSG RAN WG1 Meeting #105; Athens, Greece, Feb. 25-Mar. 1, 2019 ; ; Source:CATT ; Title:Solutions on Reduction in User Data Interruption for NR; Agenda Item:11.9.2."

"R2-1900363; 3GPP TSG-RAN WG2 Meeting #105R2-1900363; Athens, Greece, Feb. 25-Mar. 1, 2019; ; Agenda item:11.9.2 ; Source:Qualcomm Incorporated."

"R2-1900403—RACH-less handover in NR; 3GPP TSG-RAN WG2#105Tdoc R2-1900403 Athens, Greece, Feb. 25-Mar. 1, 2019; ; Agenda Item:11.9.2; Source:Ericsson; Title:RACH-less handover in NR."

"R2-1900436; 3GPP TSG-RAN WG2 Meeting #105 ; Athens, Greece, Feb. 25-Mar. 1, 2019; ; Agenda Item:11.9.2; Source:Mediatek Inc. ; Title:Solutions to Reduce HO interruption in NR and LTE."

"R2-1900502 RACH-less with SSB association; 3GPP TSG-RAN WG2 Meeting #105; Athens, Greece, Feb. 25-Mar. 1, 2019 ; ; Source: vivo ; Title:RACH-less with SSB association; Agenda Item:11.9.2."

"R2-1900607 RACH-less HO in beam-based system; 3GPP TSG-RAN WG2 Meeting #105; Athens, Greece, Feb. 25-Mar. 1, 2019; ; ; Agenda item:11.9.3; Source:Nokia, Nokia Shanghai Bell."

"R2-1900704 Discussion on RACH-less solution; 3GPP TSG-RAN WG2#105; R2-170xxxx Athens, Greece, Feb. 25-Mar. 1, 2019; ; Source: Huawei, HiSilicon ; Title: Discussion on RACH-less solution ; Agenda Item:11.9.2."

"R2-1900798 Discussion on the support of RACH-less HO in NR; 3GPP TSG-RAN WG2 Meeting #105; Athens, Greece, Feb. 25-Mar. 1, 2019 ; ; ; Source: ZTE Corporation, Sanechips; Title: Discussion on the support of RACH-less HO in NR."

"R2-1900991; 3GPP TSG-RAN WG2#105; Athens, Greece, Feb. 25-Mar. 1, 2019; Agenda Item:11.9.2; Souce:Samsung; Title:On Supporting RACH-less in NR; Document for:Discussion."

"R2-1901041 Discussion on RACH-less handover mechanism for NR; 3GPP TSG-RAN WG2 Meeting #105; Athens, Greece, Feb. 25-Mar. 1, 2019; ; Agenda Item:11.9.2; Source: ASUSTeK; Title:Discussion on RACH-less handover mechanism for NR."

Mediatek; Default Beam for U; Transmission in Transition Phase; CSD/ACT; Ming-Po Chang, Chia-Hao Yu, Weidong Yang, Jiann-Ching Guey.

* cited by examiner

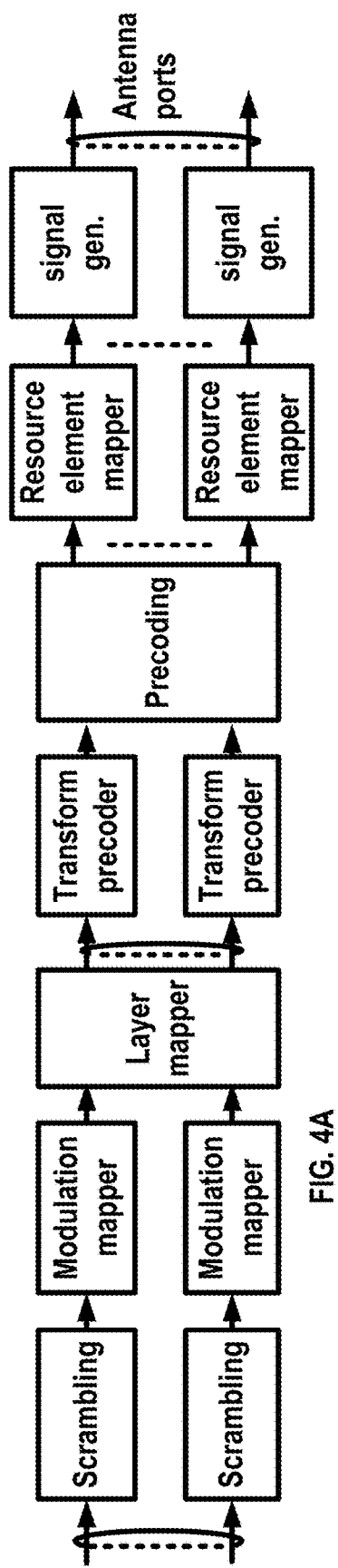
FIG. 4A
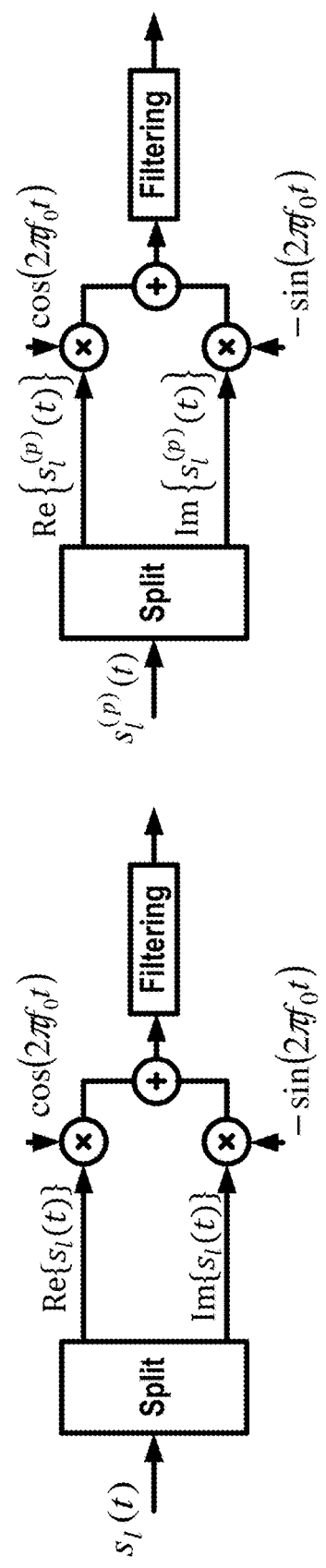
FIG. 4B
FIG. 4D
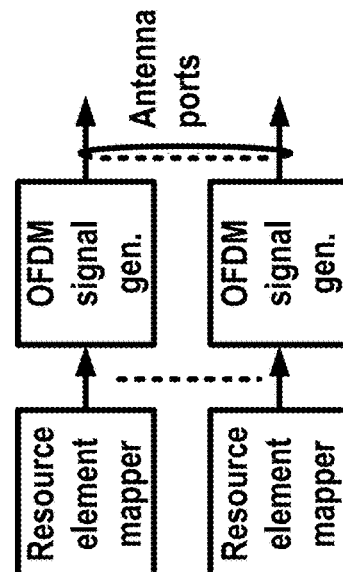
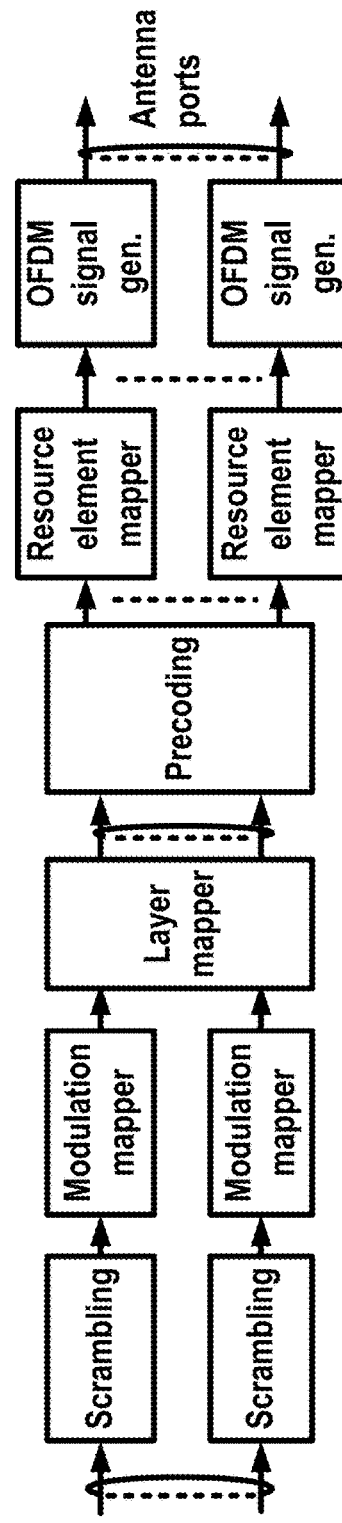
FIG. 4C

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

| $C_7$ | $C_6$ | $C_5$ | $C_4$ | $C_3$ | $C_2$ | $C_1$ | R | Oct 1 |

FIG. 20A

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

FIG. 20B

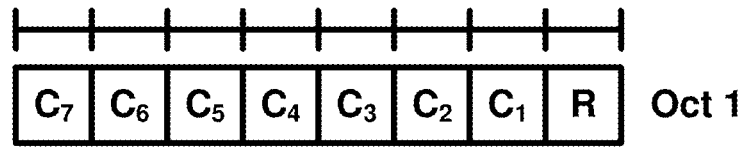
FIG. 21A
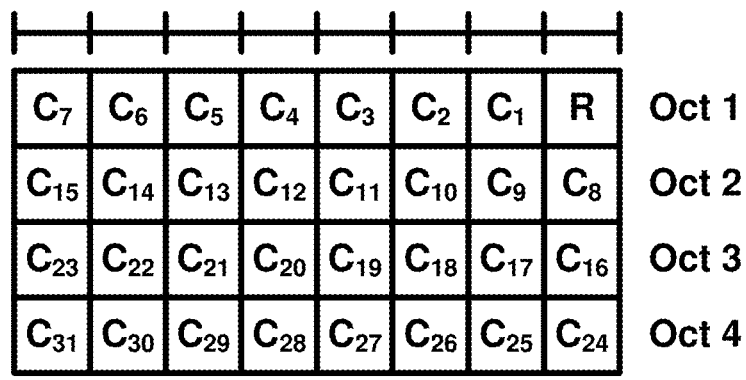
FIG. 21B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 21C

|  | DCI format | Example size (Bits) | Usage |
|---|---|---|---|
| Uplink | 0 | 45 | Uplink scheduling grant |
| | 4 | 53 | Uplink scheduling grant with spatial multiplexing |
| | 6-0A, 6-0B | 46, 36 | Uplink scheduling grant for eMTC devices |
| Downlink | 1C | 31 | Special purpose compact assignment |
| | 1A | 45 | Contiguous allocation only |
| | 1B | 46 | Codebook-based beamforming using CRS |
| | 1D | 46 | MU-MIMO using CRS |
| | 1 | 55 | Flexible allocations |
| | 2A | 64 | Open-loop spatial multiplexing using CRS |
| | 2B | 64 | Dual-layer transmission using DM-RS (TM8) |
| | 2C | 66 | Multi-layer transmission using DM-RS (TM9) |
| | 2D | 68 | Multi-layer transmission using DM-RS (TM9) |
| | 2 | 67 | Closed-loop spatial multiplexing using CRS |
| | 6-1A, 6-1B | 46, 36 | Downlink scheduling grants for eMTC devices |
| Special | 3, 3A | 45 | Power control commands |
| | 5 | | Sidelink operation |
| | 6-2 | | Paging/direct indication for eMTC devices |

FIG. 22

UPLINK BEAM MANAGEMENT IN WIRELESS COMMUNICATION SYSTEM

CROSS-REFERENCE TO RELATED APPLICATIONS

This application claims the benefit of U.S. Provisional Application No. 62/825,587, filed Mar. 28, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 18 is an example of LCIDs for DL-SCH as per an aspect of an embodiment of the present disclosure.

FIG. 19 is an example of LCIDs for UL-SCH as per an aspect of an embodiment of the present disclosure.

FIG. 20A is an example of an SCell Activation/Deactivation MAC CE of one octet as per an aspect of an embodiment of the present disclosure.

FIG. 20B is an example of an SCell Activation/Deactivation MAC CE of four octets as per an aspect of an embodiment of the present disclosure.

FIG. 21A is an example of an SCell hibernation MAC CE of one octet as per an aspect of an embodiment of the present disclosure.

FIG. 21B is an example of an SCell hibernation MAC CE of four octets as per an aspect of an embodiment of the present disclosure.

FIG. 21C is an example of MAC control elements for an SCell state transitions as per an aspect of an embodiment of the present disclosure.

FIG. 22 is an example of DCI formats as per an aspect of an embodiment of the present disclosure.

DETAILED DESCRIPTION OF EMBODIMENTS

Figure 1:
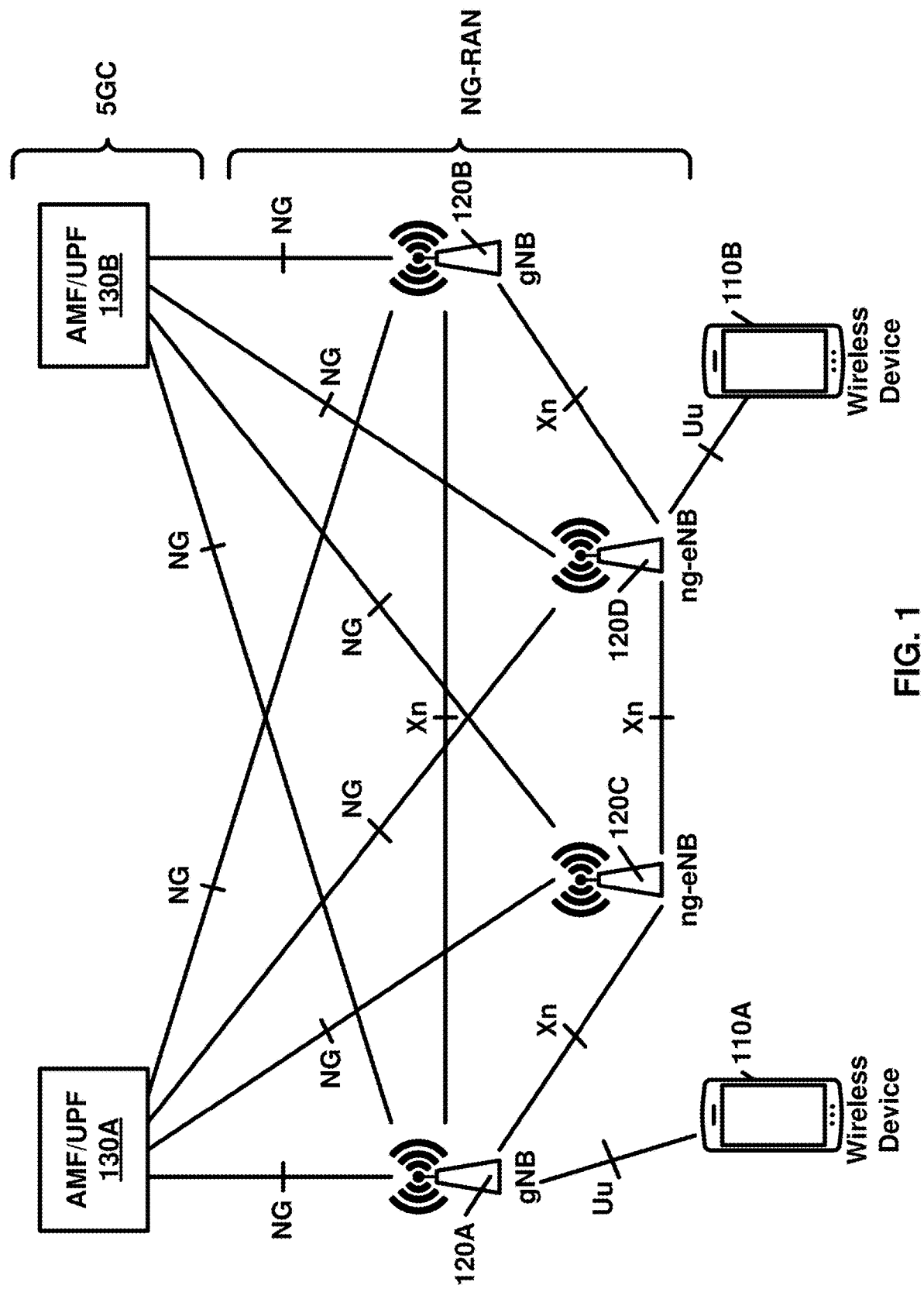
FIG. 1 is a diagram of an example RAN architecture as per an aspect of an embodiment of the present disclosure.

Example embodiments of the present disclosure enable operations on transmission and reception of a wireless device and/or one or more base stations. Embodiments of the technology disclosed herein may be employed in the technical field of multicarrier communication systems. More particularly, the embodiments of the technology disclosed herein may relate to a wireless device and/or one or more base stations in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRC Cyclic Redundancy Check
CSS Common Search Space
CU Central Unit
DAI Downlink Assignment Index
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PB CH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RNTI Radio Network Temporary Identifier
RRC Radio Resource Control
RRM Radio Resource Management
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TCI Transmission Configuration Indication
TC-RNTI Temporary Cell-Radio Network Temporary Identifier
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight inter-working between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
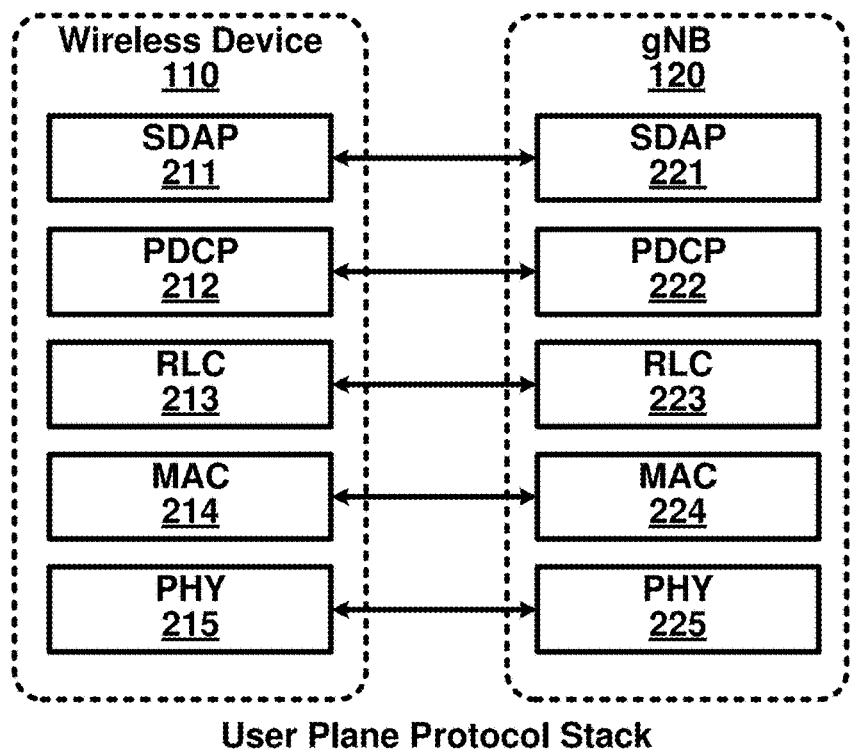
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
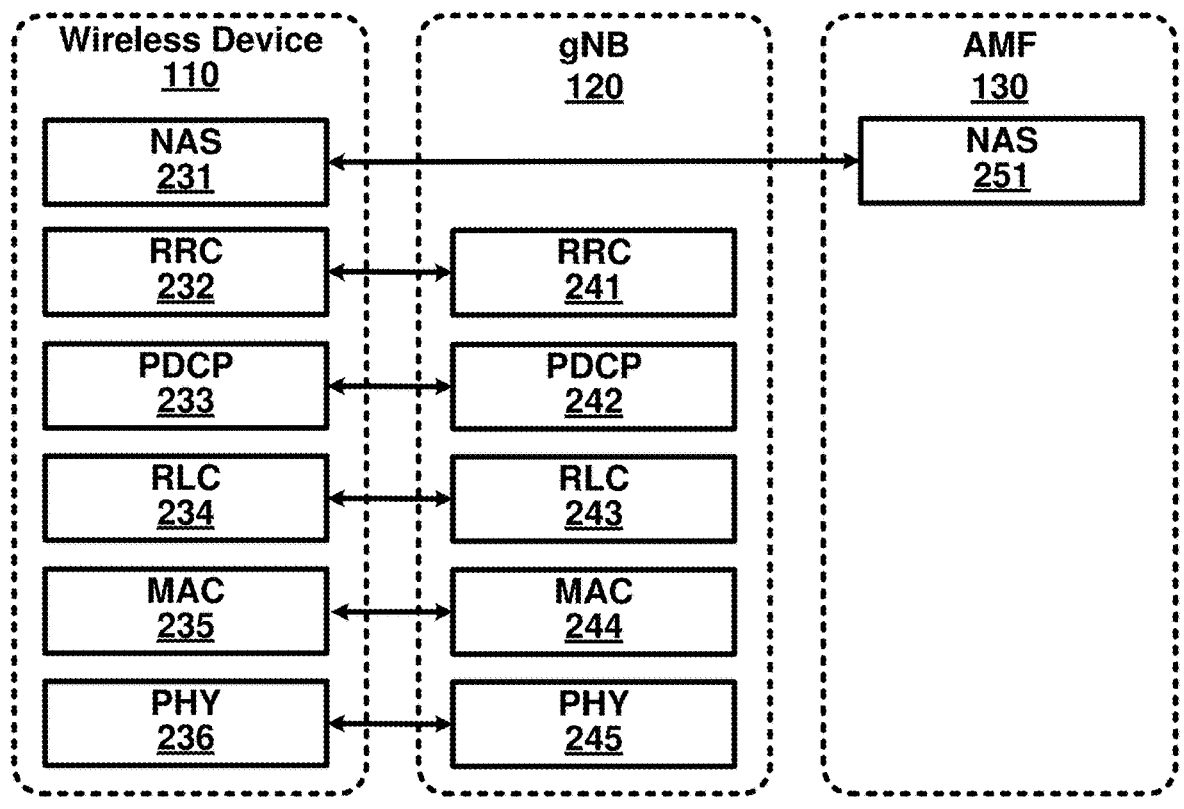
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRB s) and Data Radio Bearers (DRB s), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and an AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
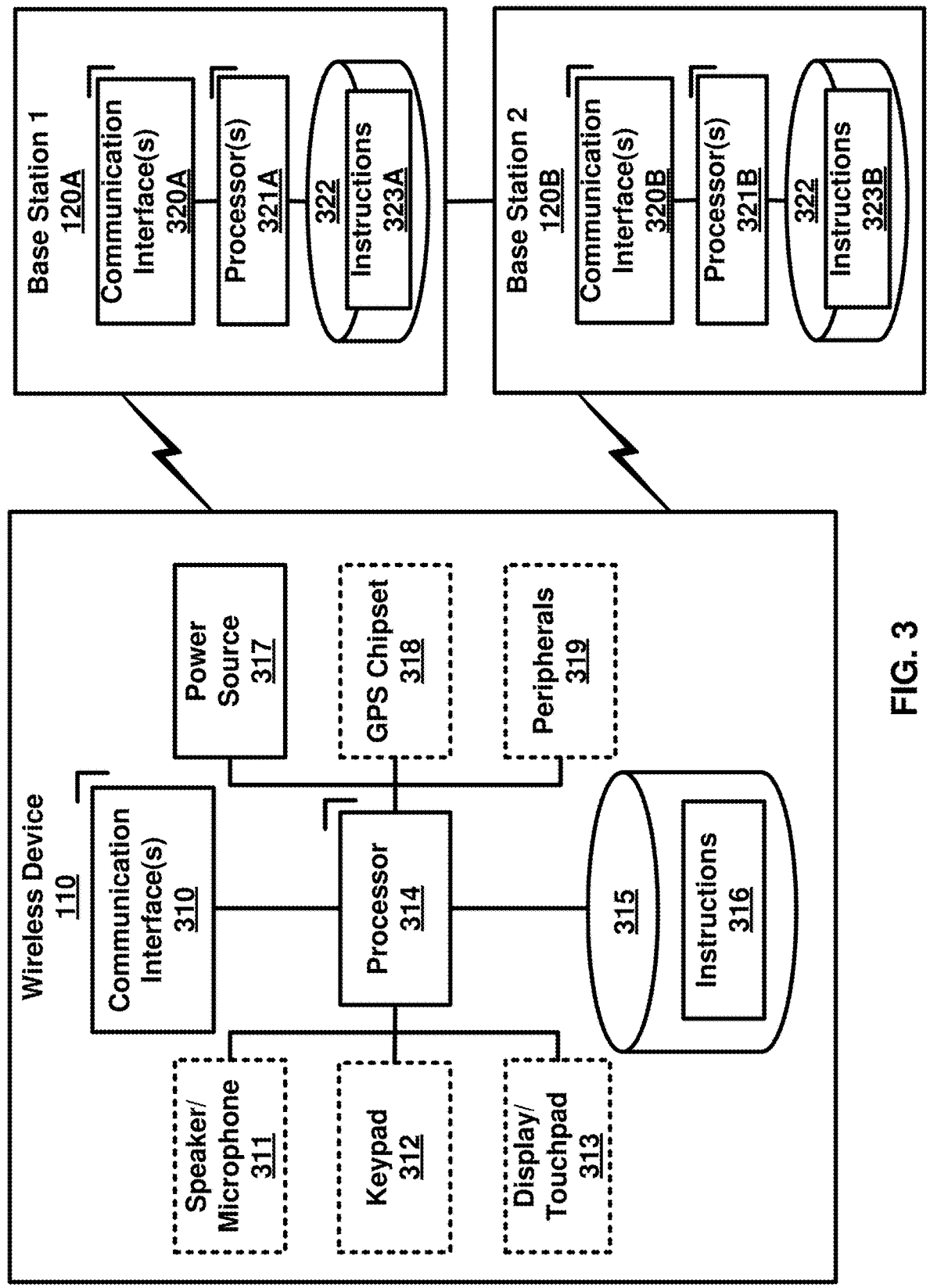
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called a UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SIs. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
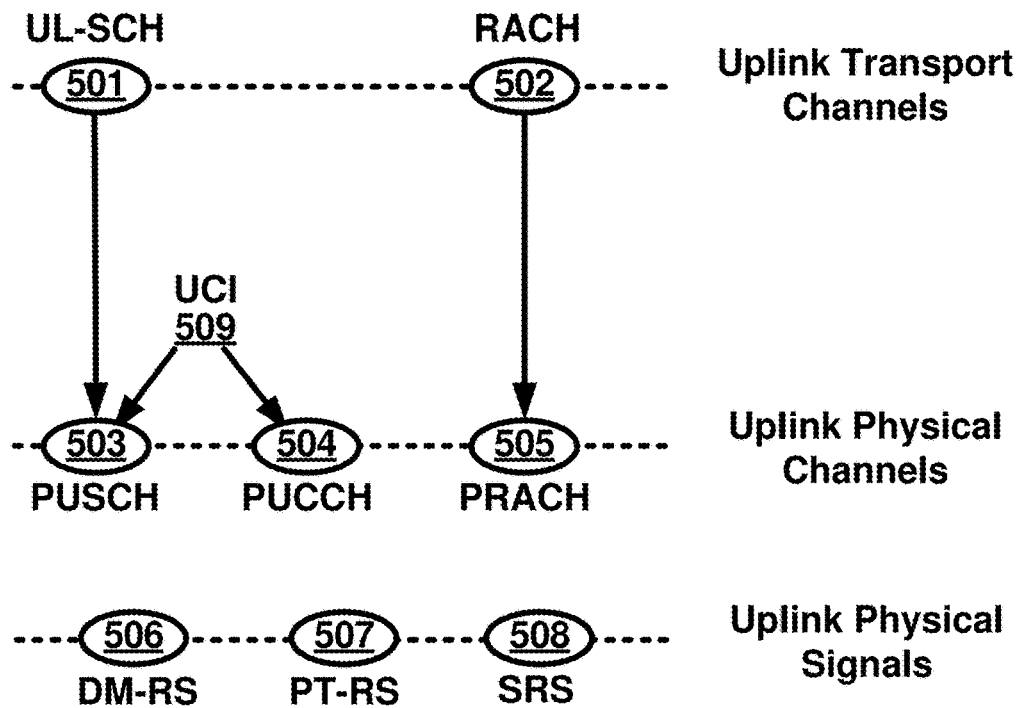
FIG. 5A is a diagram of an example uplink channel mapping and example uplink physical signals as per an aspect of an embodiment of the present disclosure.
Figure 5B:
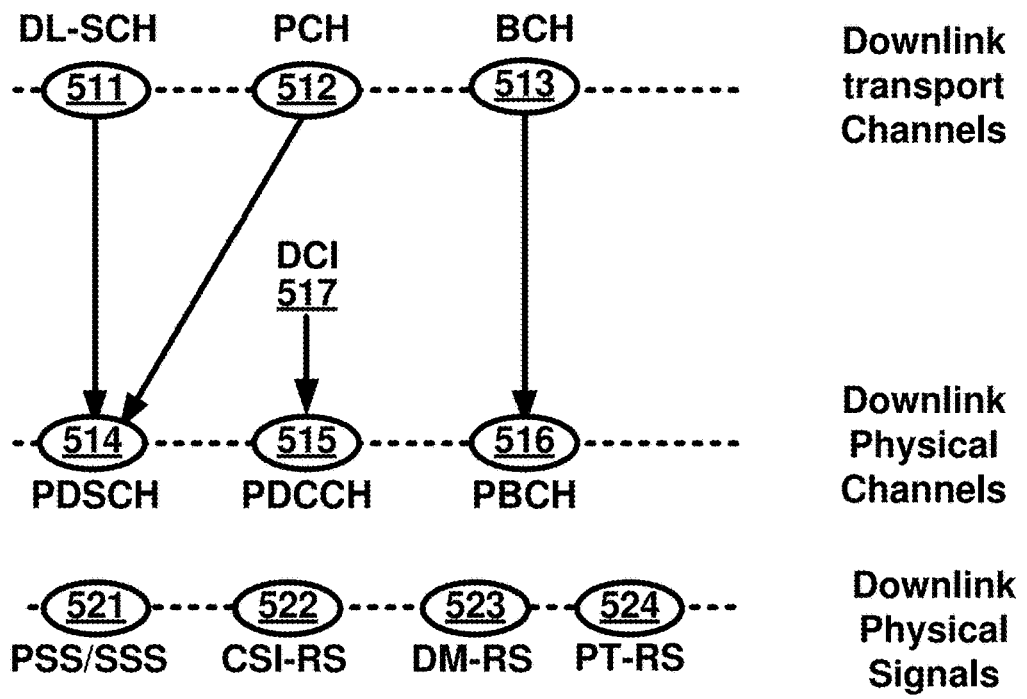
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on a PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on an RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, an SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on an RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
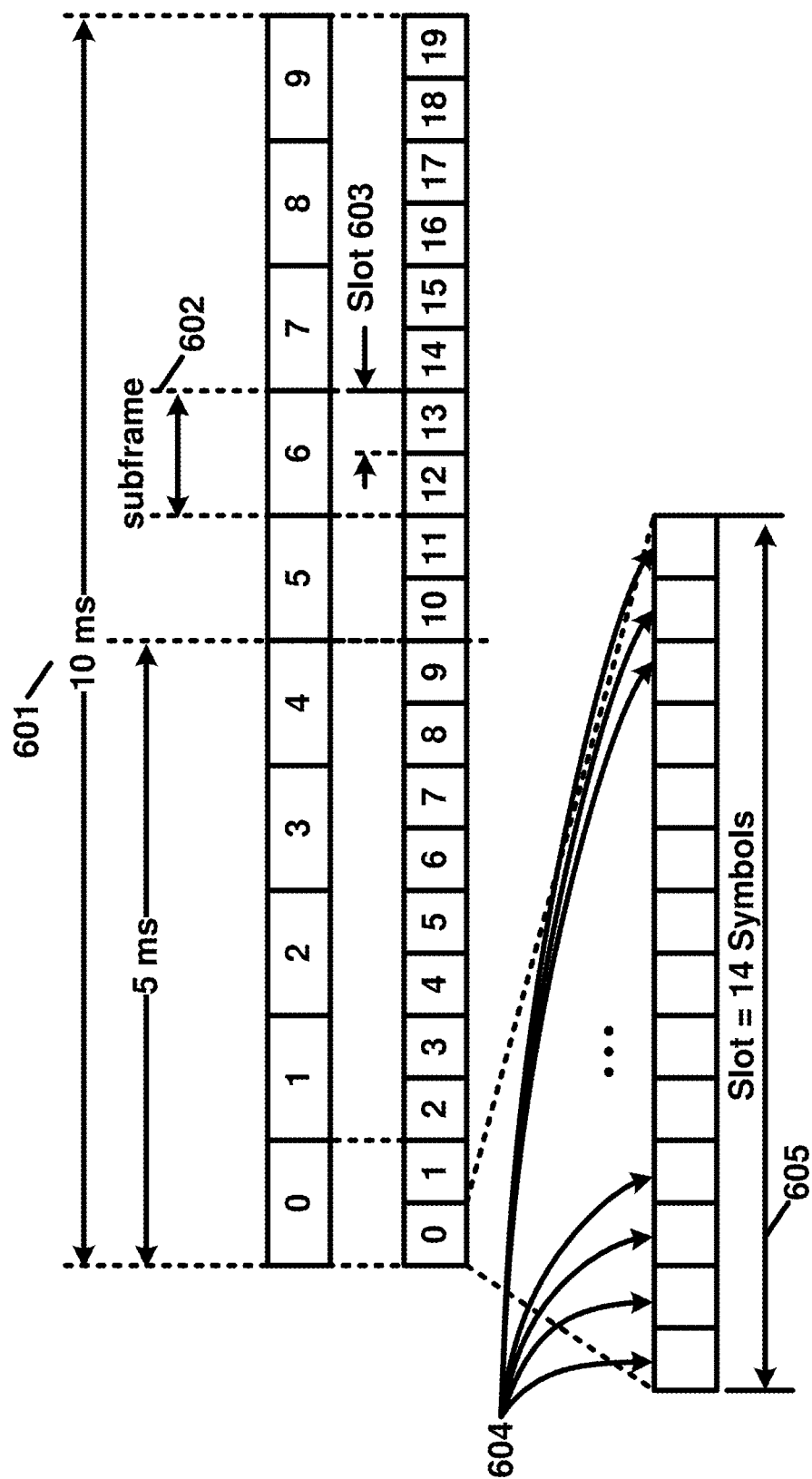
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
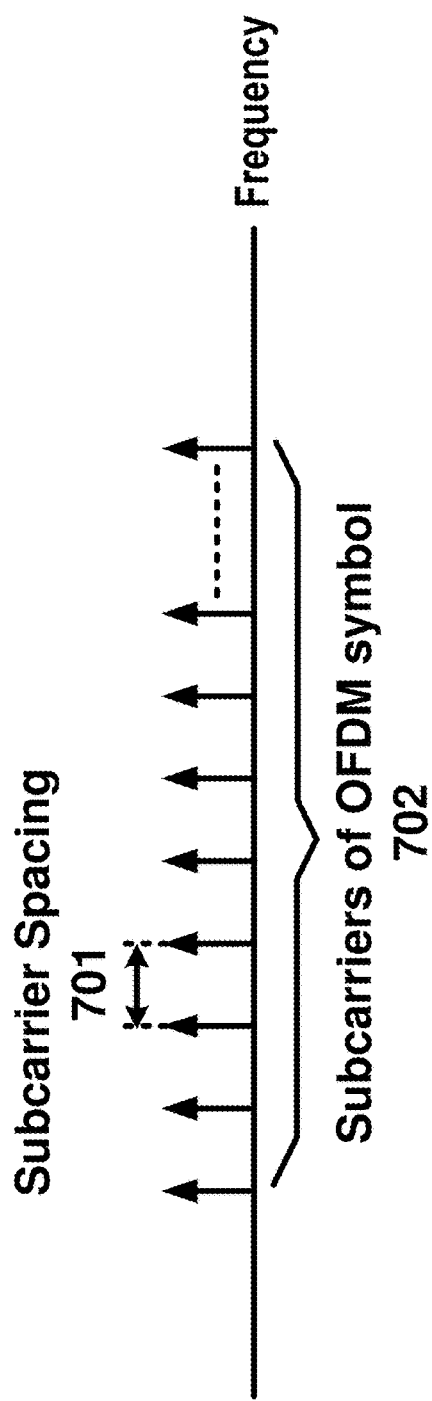
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
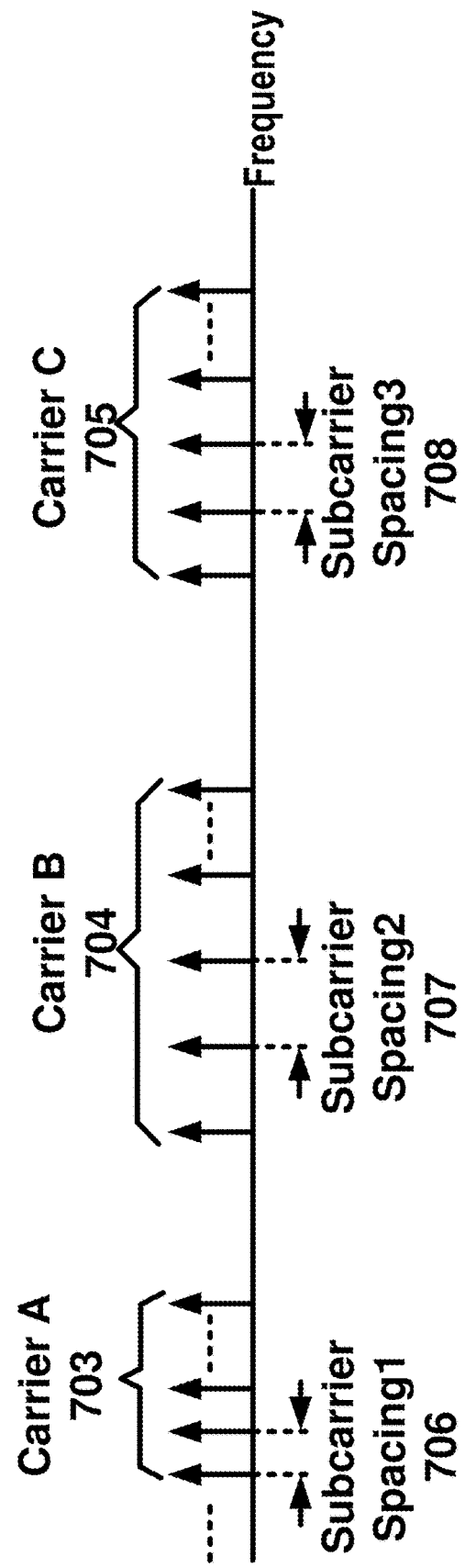

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
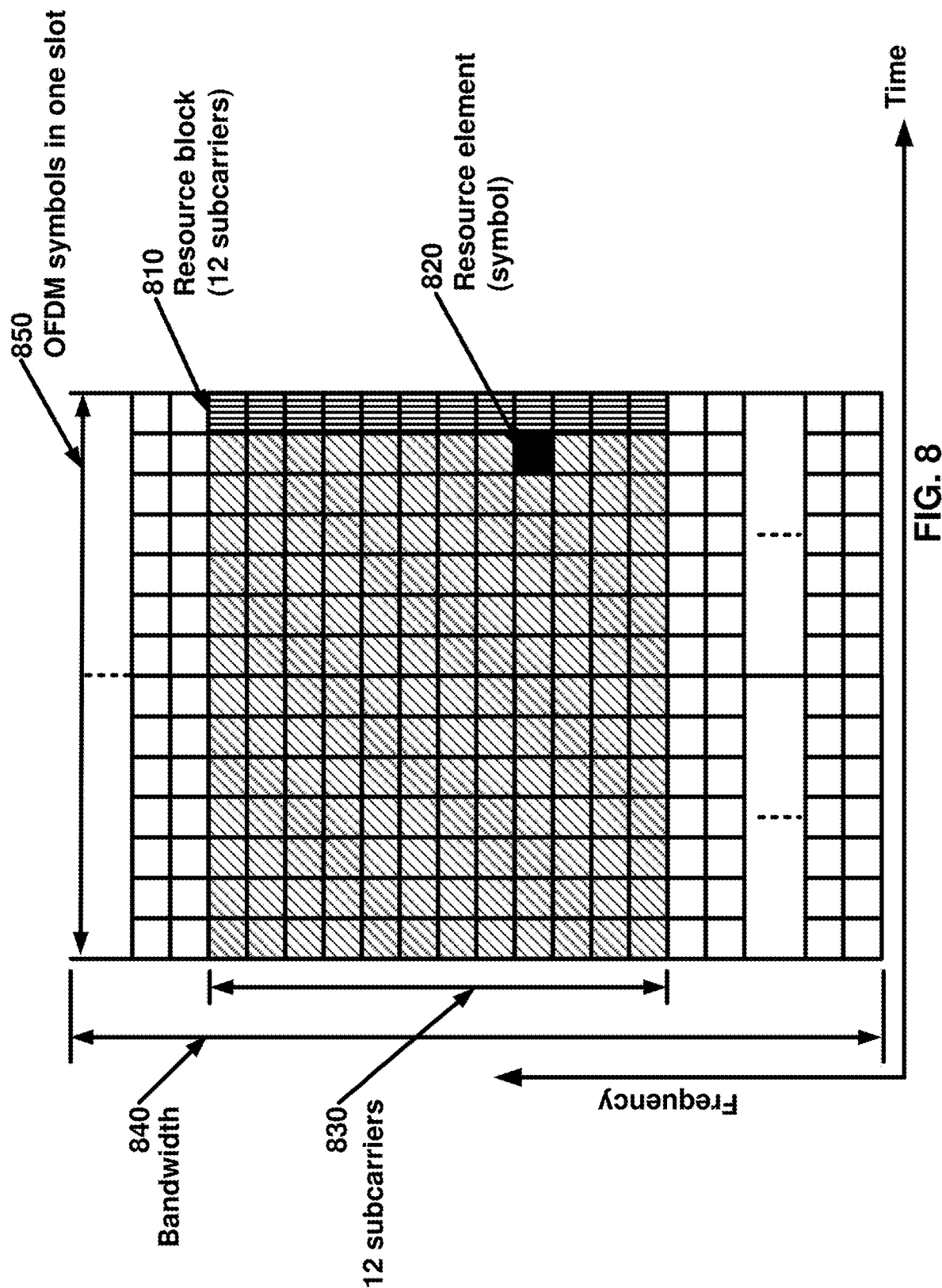
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of an RBG may depend on at least one of: an RRC message indicating an RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristic from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
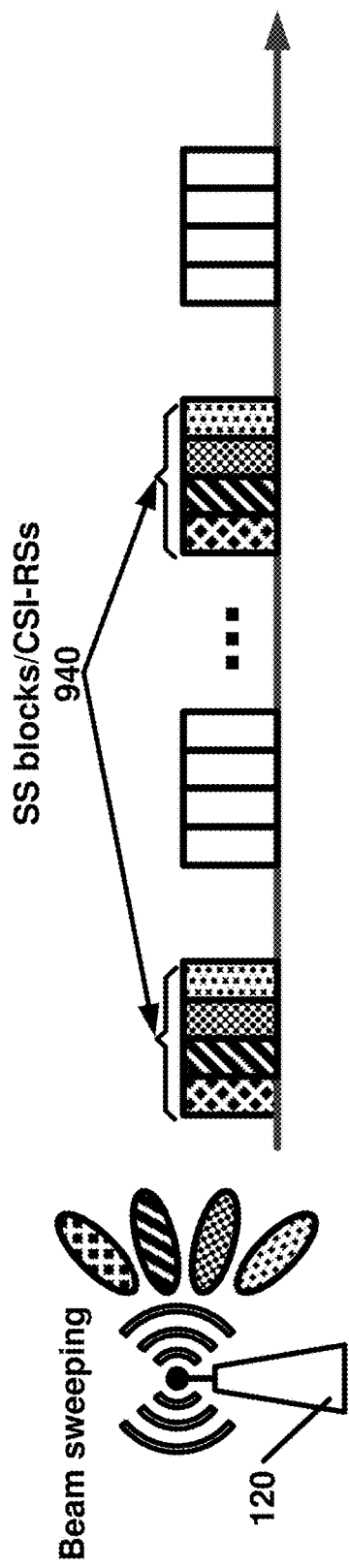
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
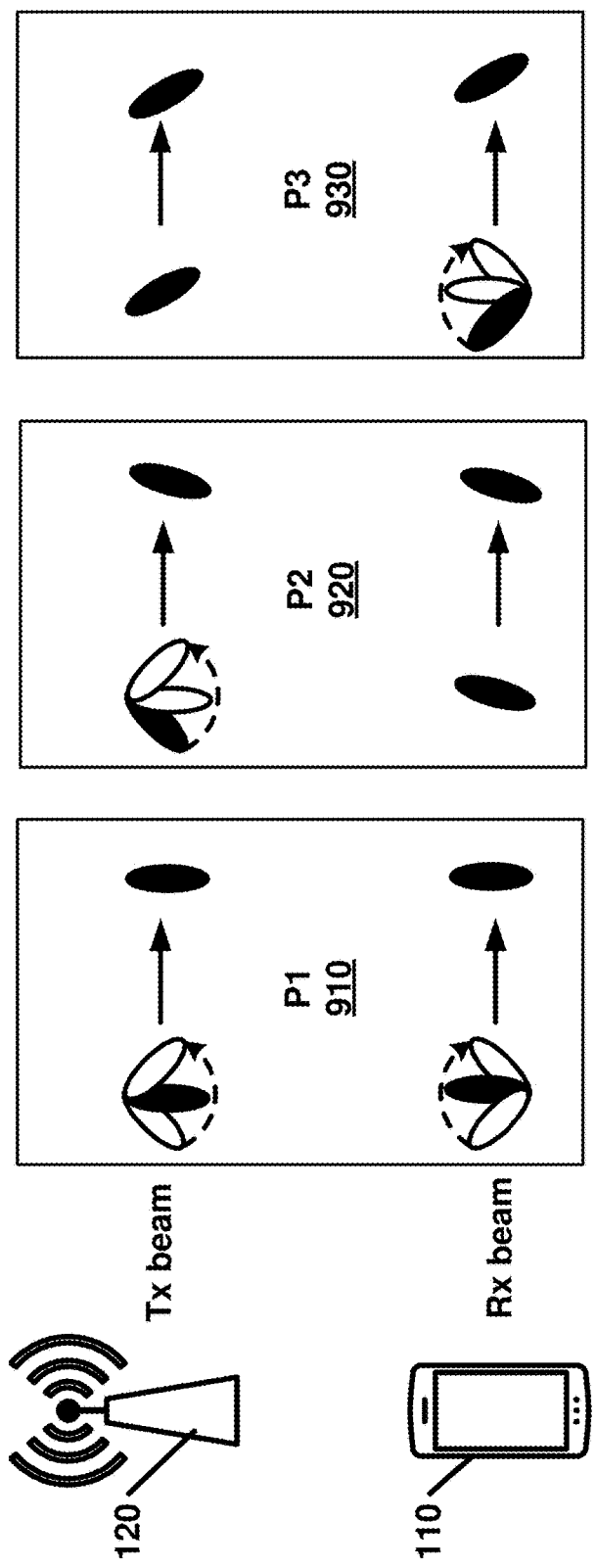
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by a UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
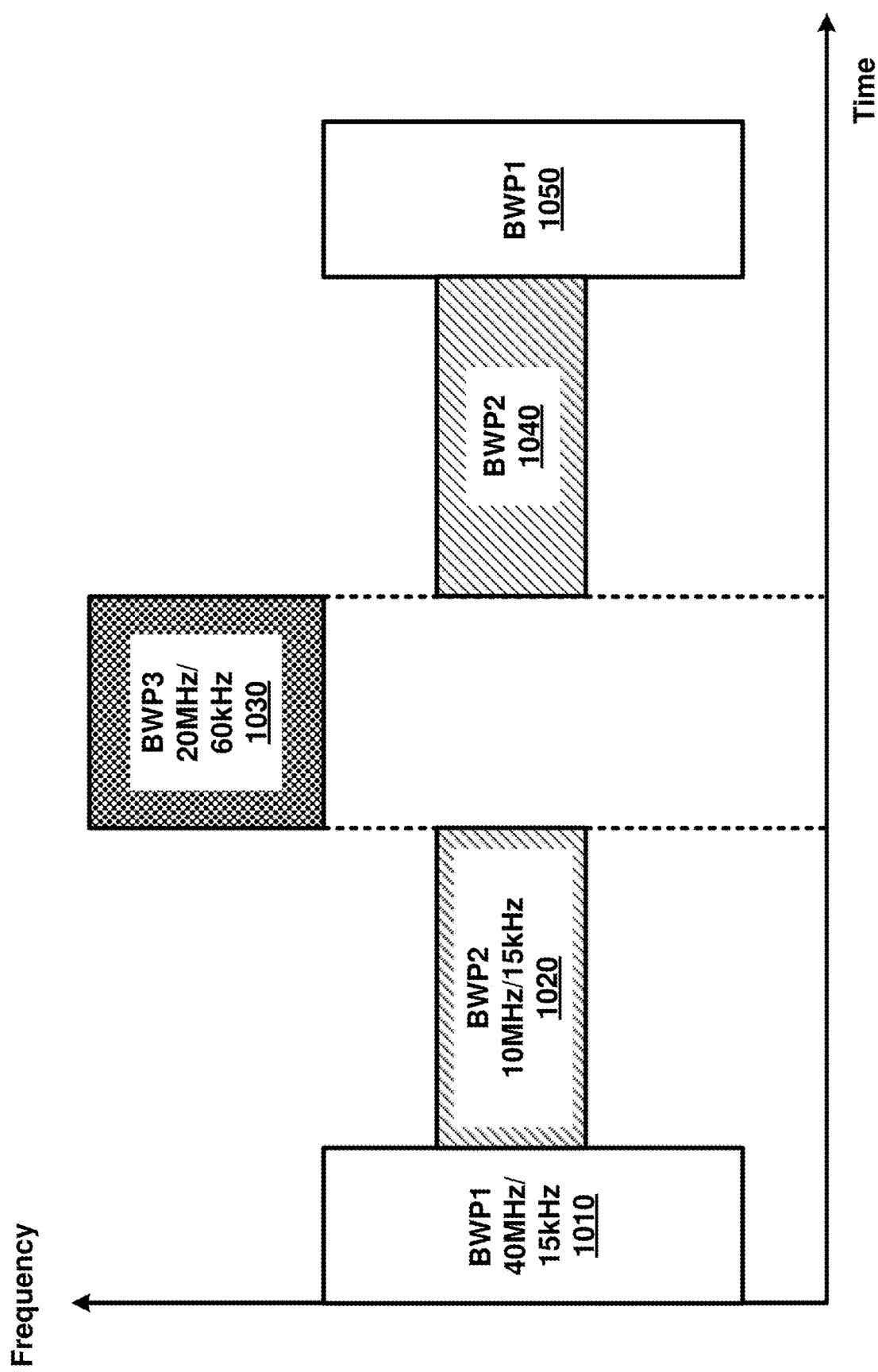
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
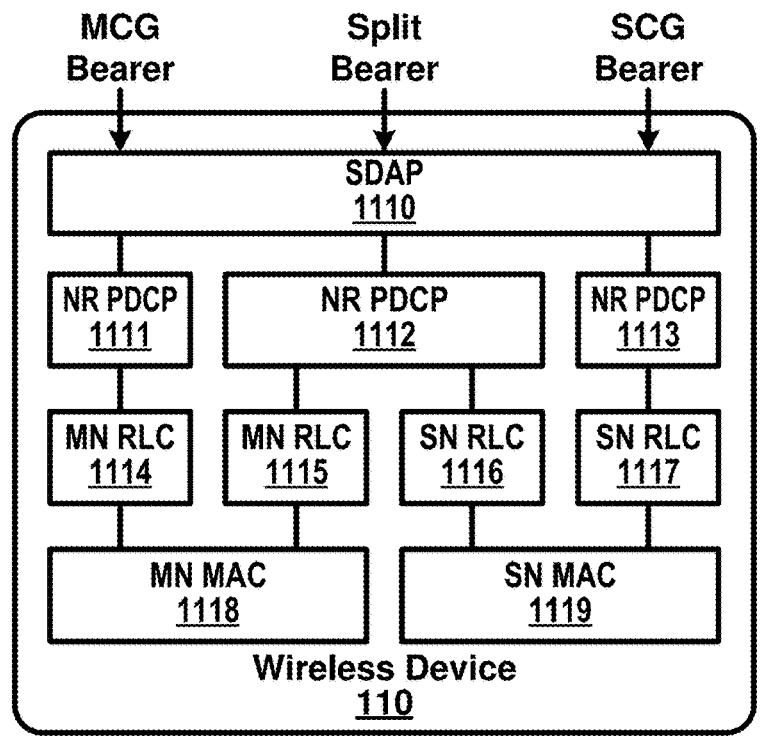
FIG. 11A, and FIG. 11B are diagrams of an example multi connectivity as per an aspect of an embodiment of the present disclosure.
Figure 11B:
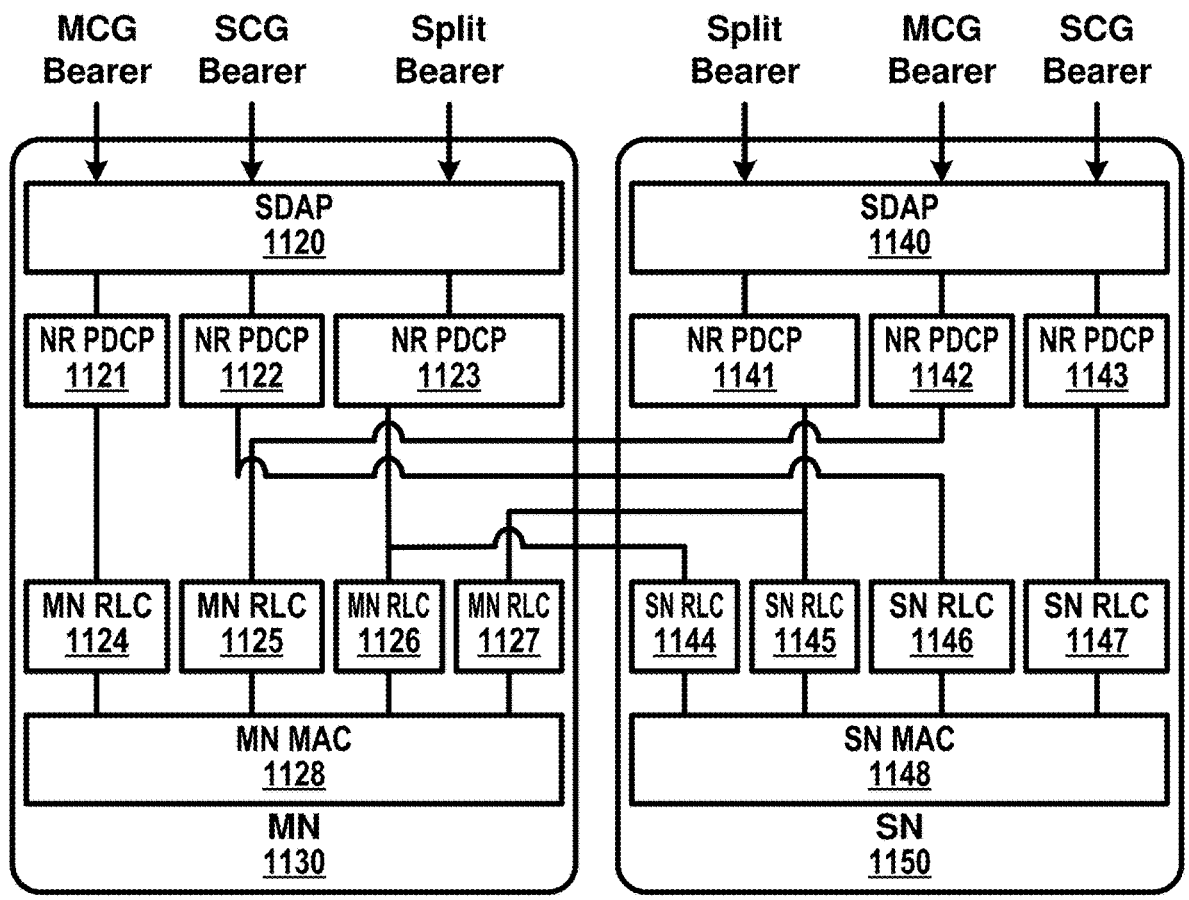

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain Radio Resource Management (RRM) measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for an SFN acquired from a MIB of a PSCell of a SCG.

Figure 12:
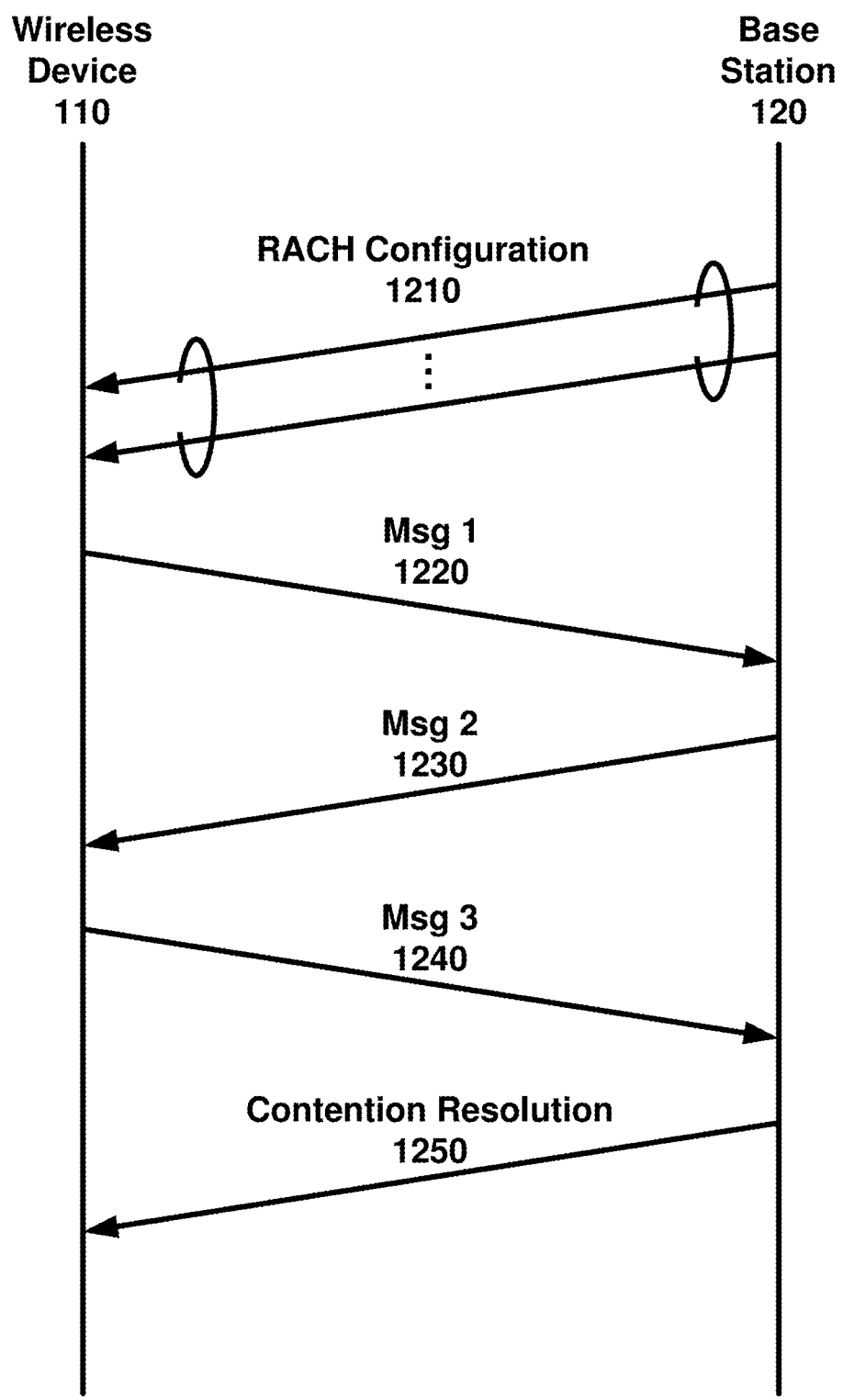
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
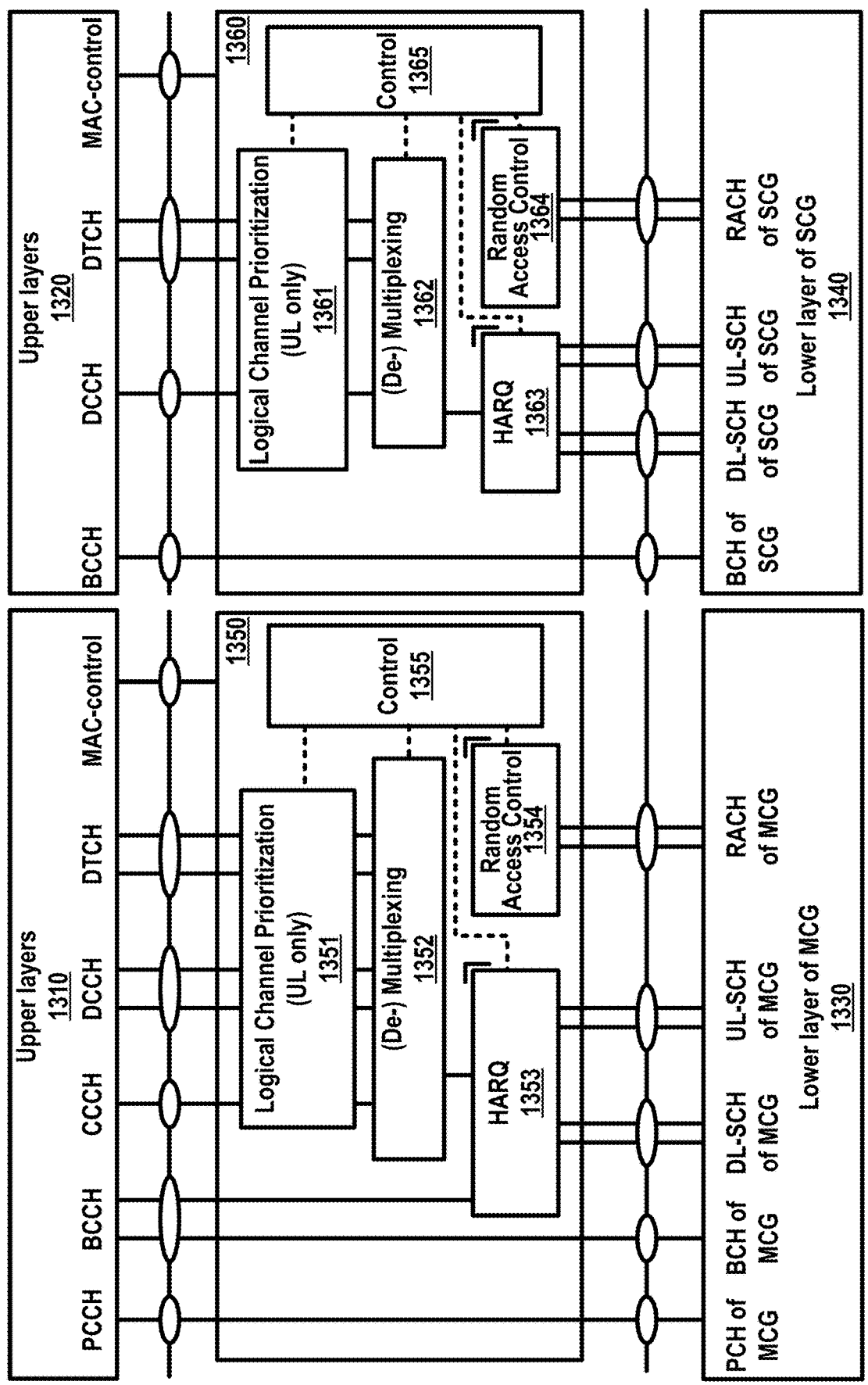
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection reestablishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
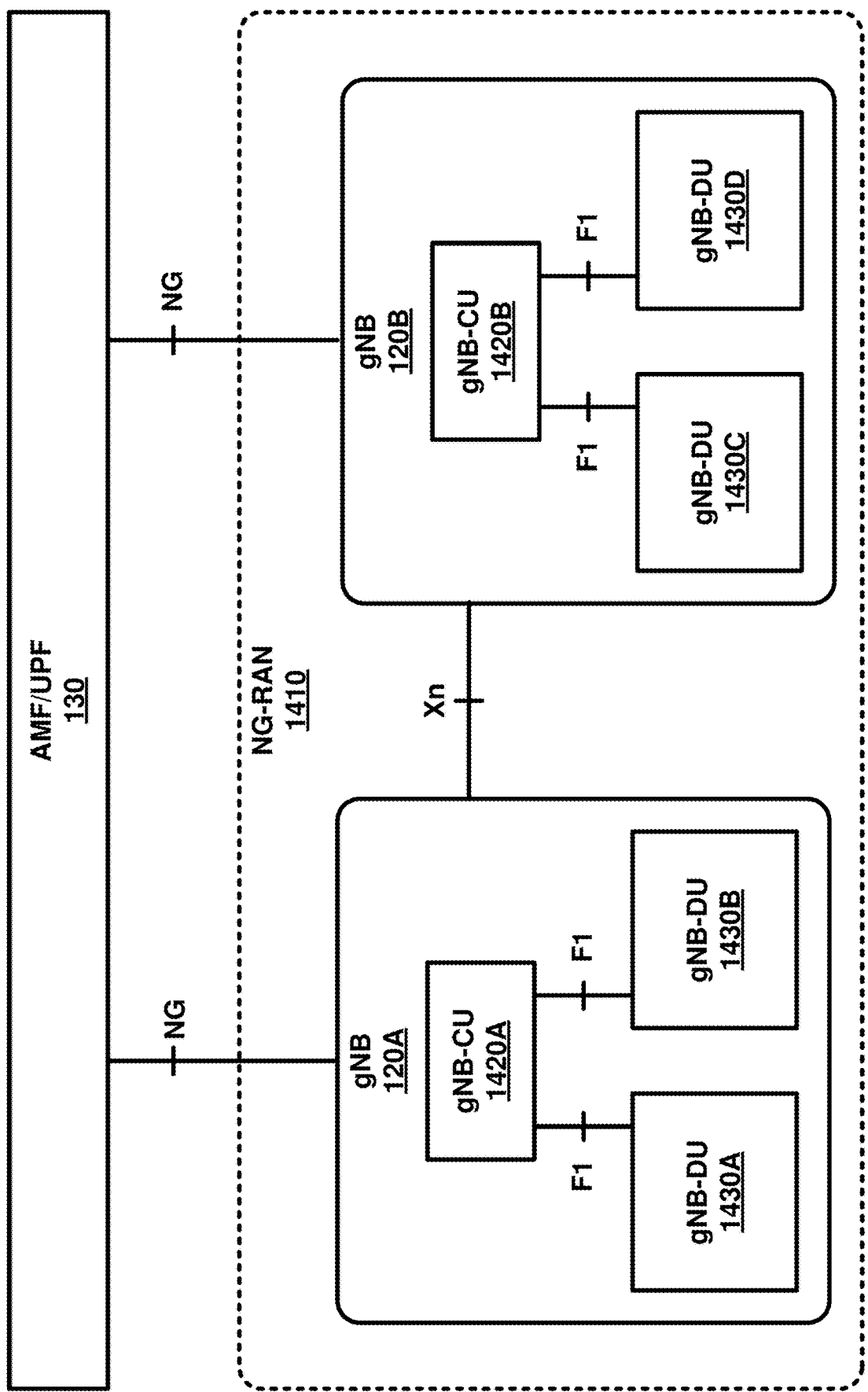
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
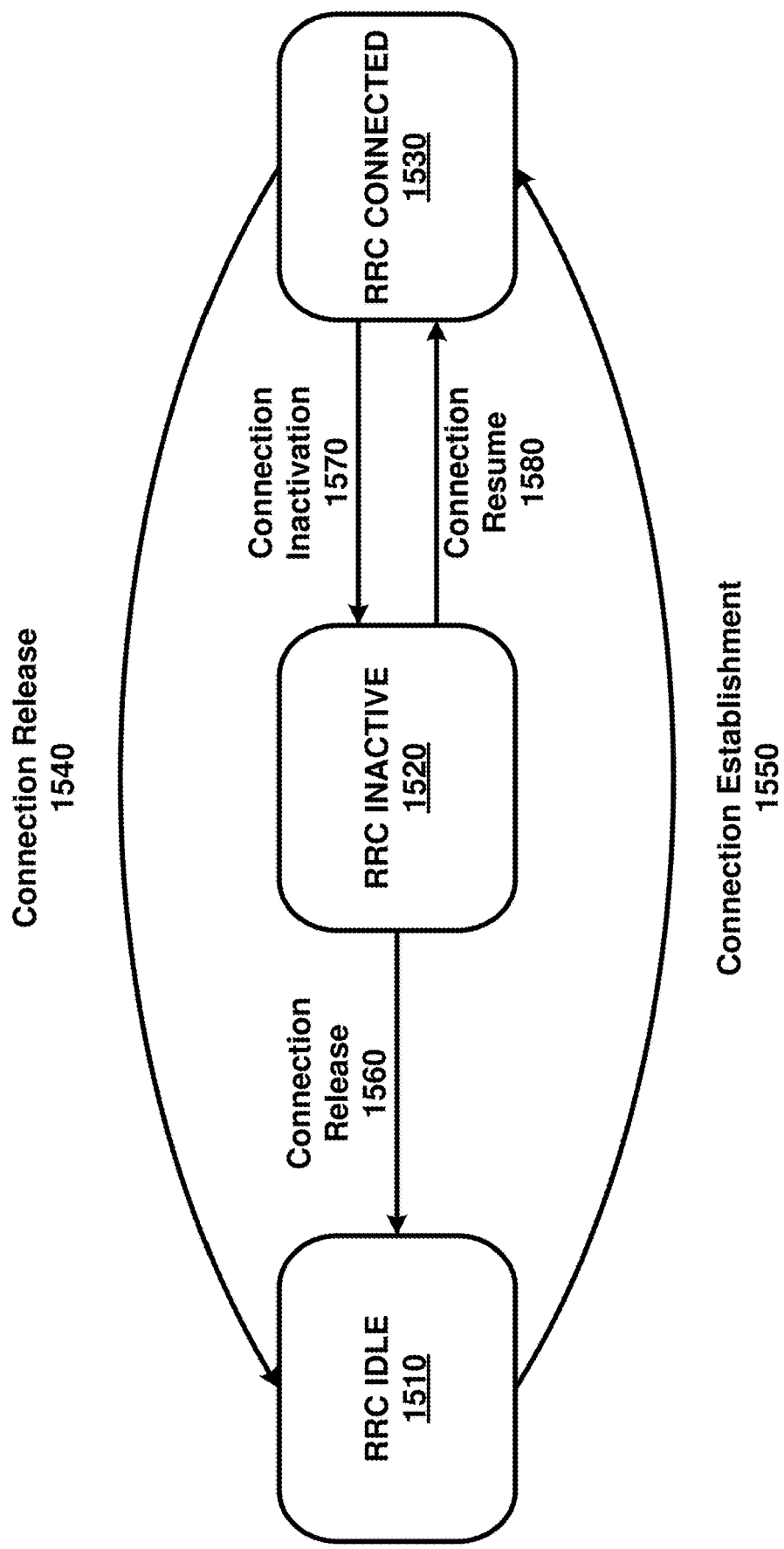
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC Idle), and/or an RRC inactive state (e.g. RRC_Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A gNB may transmit one or more MAC PDUs to a wireless device. In an example, a MAC PDU may be a bit string that is byte aligned (e.g., a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., a multiple of eight bits) in length. In an example, a MAC SDU may be included in a MAC PDU from the first bit onward.

In an example, a MAC CE may be a bit string that is byte aligned (e.g., a multiple of eight bits) in length.

In an example, a MAC subheader may be a bit string that is byte aligned (e.g., a multiple of eight bits) in length. In an example, a MAC subheader may be placed immediately in front of a corresponding MAC SDU, MAC CE, or padding.

In an example, a MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one bit length; an LCID field with a multi-bit length; and/or an L field with a multi-bit length.

Figure 16A:
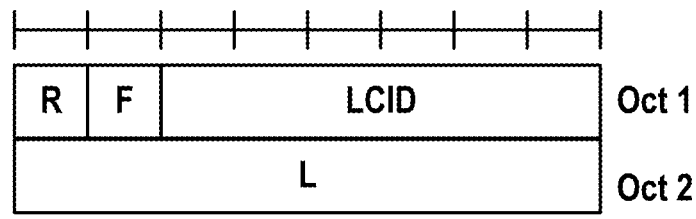
FIG. 16A, FIG. 16B and FIG. 16C are examples of MAC subheaders as per an aspect of an embodiment of the present disclosure.
Figure 16B:
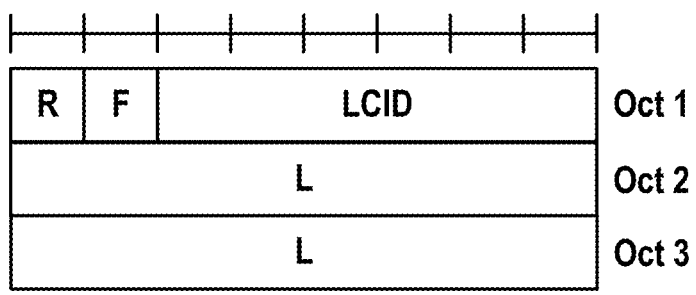

FIG. 16A shows an example of a MAC subheader with an R field, an F field, an LCID field, and an L field. In the example MAC subheader of FIG. 16A, the LCID field may be six bits in length, and the L field may be eight bits in length. FIG. 16B shows example of a MAC subheader with an R field, a F field, an LCID field, and an L field. In the example MAC subheader of FIG. 16B, the LCID field may be six bits in length, and the L field may be sixteen bits in length.

Figure 16C:
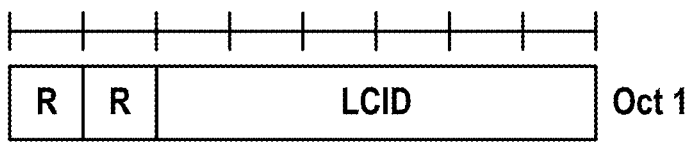

In an example, when a MAC subheader corresponds to a fixed sized MAC CE or padding, the MAC subheader may comprise: an R field with a two bit length and an LCID field with a multi-bit length. FIG. 16C shows an example of a MAC subheader with an R field and an LCID field. In the example MAC subheader of FIG. 16C, the LCID field may be six bits in length, and the R field may be two bits in length.

Figure 17A:
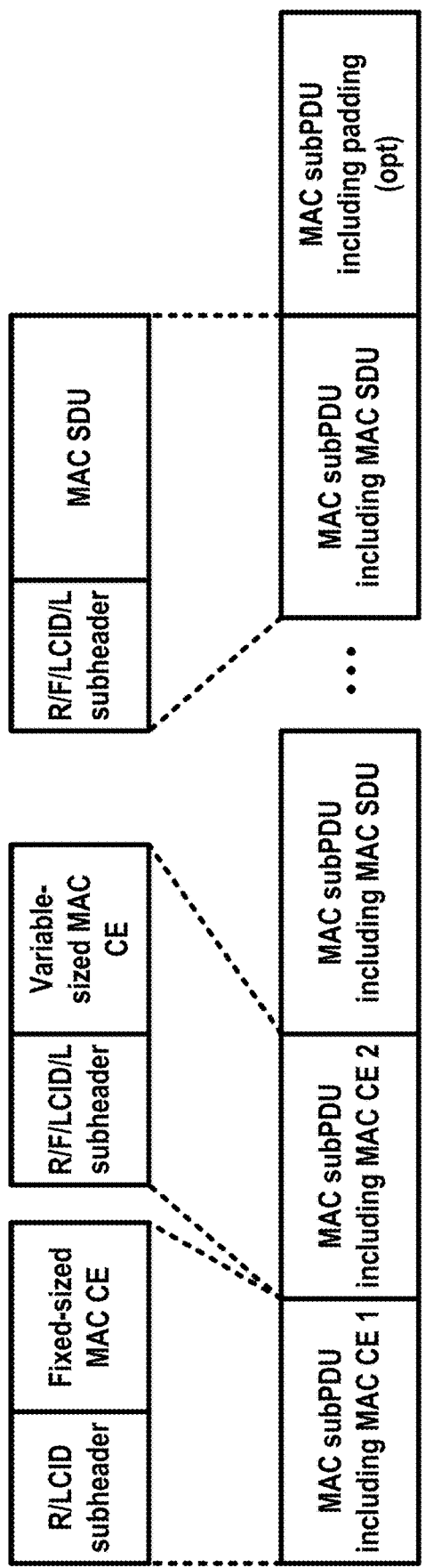
FIG. 17A and FIG. 17B are examples of MAC PDUs as per an aspect of an embodiment of the present disclosure.

FIG. 17A shows an example of a DL MAC PDU. In the example of FIG. 17A, multiple MAC CEs, such as MAC CE 1 and 2, may be placed together. A MAC subPDU comprising a MAC CE may be placed before any MAC subPDU comprising a MAC SDU or a MAC subPDU comprising padding.

Figure 17B:
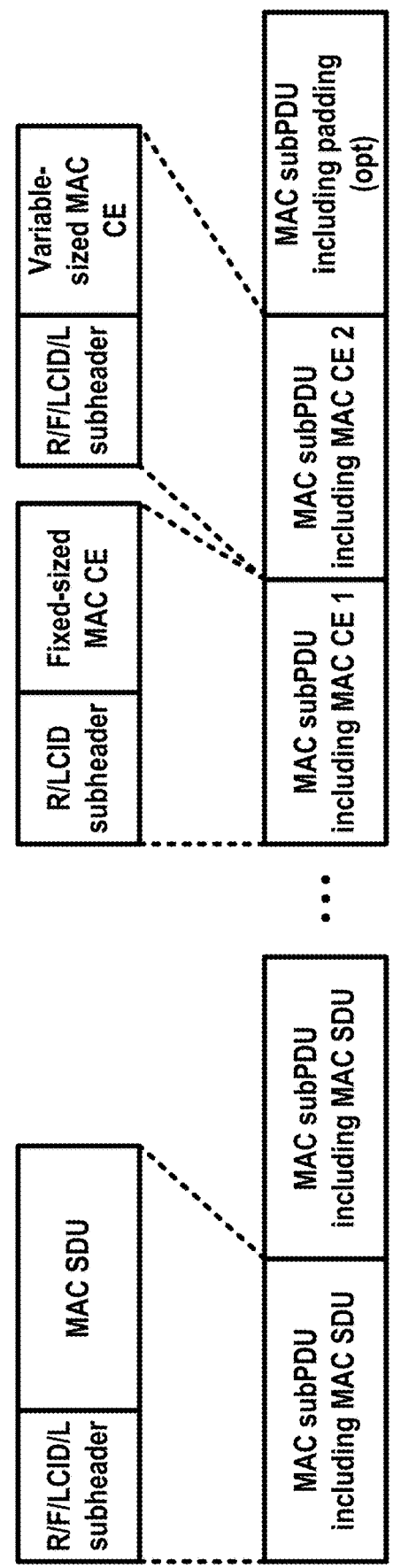

FIG. 17B shows an example of a UL MAC PDU. In the example of FIG. 17B, multiple MAC CEs, such as MAC CE 1 and 2, may be placed together. A MAC subPDU comprising a MAC CE may be placed after all MAC subPDUs comprising a MAC SDU. In addition, the MAC subPDU may be placed before a MAC subPDU comprising padding.

In an example, a MAC entity of a gNB may transmit one or more MAC CEs to a MAC entity of a wireless device. FIG. 18 shows an example of multiple LCIDs that may be associated with the one or more MAC CEs. In the example of FIG. 18, the one or more MAC CEs comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; an SCell activation/deactivation MAC CE (1 Octet); an SCell activation/deactivation MAC CE (4 Octet); and/or a duplication activation/deactivation MAC CE. In an example, a MAC CE, such as a MAC CE transmitted by a MAC entity of a gNB to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the gNB one or more MAC CEs. FIG. 19 shows an example of the one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

FIG. 20A shows an example of an SCell Activation/Deactivation MAC CE of one octet. A first MAC PDU subheader with a first LCID (e.g., '111010' as shown in FIG. 18) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

FIG. 20B shows an example of an SCell Activation/Deactivation MAC CE of four octets. A second MAC PDU subheader with a second LCID (e.g., '111001' as shown in FIG. 18) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. The R field may be set to zero.

When configured with CA, a base station and/or a wireless device may employ a hibernation mechanism for an SCell to improve battery or power consumption of the wireless device and/or to improve latency of SCell activation/addition. When the wireless device hibernates the SCell, the SCell may be transitioned into a dormant state. In response to the SCell being transitioned into a dormant state, the wireless device may: stop transmitting SRS on the SCell; report CQI/PMI/RI/PTI/CRI for the SCell according to a periodicity configured for the SCell in a dormant state; not transmit on UL-SCH on the SCell; not transmit on RACH on the SCell; not monitor the PDCCH on the SCell; not monitor the PDCCH for the SCell; and/or not transmit PUCCH on the SCell. In an example, reporting CSI for an SCell and not monitoring the PDCCH on/for the SCell, when the SCell is in a dormant state, may provide the base station an always-updated CSI for the SCell. With the always-updated CSI, the base station may employ a quick and/or accurate channel adaptive scheduling on the SCell once the SCell is transitioned back into active state, thereby speeding up the activation procedure of the SCell. In an example, reporting CSI for the SCell and not monitoring the PDCCH on/for the SCell, when the SCell is in dormant state, may improve battery or power consumption of the wireless device, while still providing the base station timely and/or accurate channel information feedback. In an example, a PCell/PSCell and/or a PUCCH secondary cell may not be configured or transitioned into dormant state.

When configured with one or more SCells, a gNB may activate, hibernate, or deactivate at least one of the one or more SCells. In an example, a gNB may transmit one or more RRC messages comprising parameters indicating at least one SCell being set to an active state, a dormant state, or an inactive state, to a wireless device.

In an example, when an SCell is in an active state, the wireless device may perform SRS transmissions on the SCell; CQI/PMI/RI/CRI reporting for the SCell; PDCCH monitoring on the SCell; PDCCH monitoring for the SCell; and/or PUCCH/SPUCCH transmissions on the SCell.

In an example, when an SCell is in an inactive state, the wireless device may: not transmit SRS on the SCell; not report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

In an example, when an SCell is in a dormant state, the wireless device may: not transmit SRS on the SCell; report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

When configured with one or more SCells, a gNB may activate, hibernate, or deactivate at least one of the one or more SCells. In an example, a gNB may transmit one or more MAC control elements comprising parameters indicating activation, deactivation, or hibernation of at least one SCell to a wireless device.

In an example, a gNB may transmit a first MAC CE (e.g., activation/deactivation MAC CE, as shown in FIG. 20A or FIG. 20B) indicating activation or deactivation of at least one SCell to a wireless device. In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. In an example, the R field may be set to zero.

In an example, a gNB may transmit a second MAC CE (e.g., hibernation MAC CE) indicating activation or hibernation of at least one SCell to a wireless device. In an example, the second MAC CE may be associated with a second LCID different from a first LCID of the first MAC CE (e.g., activation/deactivation MAC CE). In an example, the second MAC CE may have a fixed size. In an example, the second MAC CE may consist of a single octet containing seven C-fields and one R-field. FIG. 21A shows an example of the second MAC CE with a single octet. In another example, the second MAC CE may consist of four octets containing 31 C-fields and one R-field. FIG. 21B shows an example of the second MAC CE with four octets. In an example, the second MAC CE with four octets may be associated with a third LCID different from the second LCID for the second MAC CE with a single octet, and/or the first LCID for activation/deactivation MAC CE. In an example, when there is no SCell with a serving cell index greater than 7, the second MAC CE of one octet may be applied, otherwise the second MAC CE of four octets may be applied.

In an example, when the second MAC CE is received, and the first MAC CE is not received, $C_i$ may indicate a dormant/activated status of an SCell with SCell index i if there is an SCell configured with SCell index i, otherwise the MAC entity may ignore the $C_i$ field. In an example, when $C_i$ is set to "1", the wireless device may transition an SCell associated with SCell index i into a dormant state. In an example, when $C_i$ is set to "0", the wireless device may activate an SCell associated with SCell index i. In an example, when $C_i$ is set to "0" and the SCell with SCell index i is in a dormant state, the wireless device may activate the SCell with SCell index i. In an example, when $C_i$ is set to "0" and the SCell with SCell index i is not in a dormant state, the wireless device may ignore the $C_i$ field.

In an example, when both the first MAC CE (activation/deactivation MAC CE) and the second MAC CE (hibernation MAC CE) are received, two $C_i$ fields of the two MAC CEs may indicate possible state transitions of the SCell with SCell index i if there is an SCell configured with SCell index i, otherwise the MAC entity may ignore the $C_i$ fields. In an example, the $C_i$ fields of the two MAC CEs may be interpreted according to FIG. 21C.

When configured with one or more SCells, a gNB may activate, hibernate, or deactivate at least one of the one or more SCells. In an example, a MAC entity of a gNB and/or a wireless device may maintain an SCell deactivation timer (e.g., sCellDeactivationTimer) per configured SCell (except the SCell configured with PUCCH/SPUCCH, if any) and deactivate the associated SCell upon its expiry.

In an example, a MAC entity of a gNB and/or a wireless device may maintain an SCell hibernation timer (e.g., sCellHibernationTimer) per configured SCell (except the SCell configured with PUCCH/SPUCCH, if any) and hibernate the associated SCell upon the SCell hibernation timer expiry if the SCell is in active state. In an example, when both the SCell deactivation timer and the SCell hibernation timer are configured, the SCell hibernation timer may take priority over the SCell deactivation timer. In an example, when both the SCell deactivation timer and the SCell hibernation timer are configured, a gNB and/or a wireless device may ignore the SCell deactivation timer regardless of the SCell deactivation timer expiry.

In an example, a MAC entity of a gNB and/or a wireless device may maintain a dormant SCell deactivation timer (e.g., dormantSCellDeactivationTimer) per configured SCell (except the SCell configured with PUCCH/SPUCCH, if any), and deactivate the associated SCell upon the dormant SCell deactivation timer expiry if the SCell is in dormant state.

In an example, when a MAC entity of a wireless device is configured with an activated SCell upon SCell configuration, the MAC entity may activate the SCell. In an example, when a MAC entity of a wireless device receives a MAC CE(s) activating an SCell, the MAC entity may activate the SCell. In an example, the MAC entity may start or restart the SCell deactivation timer associated with the SCell in response to activating the SCell. In an example, the MAC entity may start or restart the SCell hibernation timer (if configured) associated with the SCell in response to activating the SCell. In an example, the MAC entity may trigger PHR procedure in response to activating the SCell.

In an example, when a MAC entity of a wireless device receives a MAC CE(s) indicating deactivating an SCell, the MAC entity may deactivate the SCell. In an example, in response to receiving the MAC CE(s), the MAC entity may: deactivate the SCell; stop an SCell deactivation timer associated with the SCell; and/or flush all HARQ buffers associated with the SCell.

In an example, when an SCell deactivation timer associated with an activated SCell expires and an SCell hibernation timer is not configured, the MAC entity may: deactivate the SCell; stop the SCell deactivation timer associated with the SCell; and/or flush all HARQ buffers associated with the SCell.

In an example, when a first PDCCH on an activated SCell indicates an uplink grant or downlink assignment, or a second PDCCH on a serving cell scheduling an activated SCell indicates an uplink grant or a downlink assignment for the activated SCell, or a MAC PDU is transmitted in a configured uplink grant or received in a configured downlink assignment, the MAC entity may: restart the SCell deactivation timer associated with the SCell; and/or restart the SCell hibernation timer associated with the SCell if configured. In an example, when an SCell is deactivated, an ongoing random access procedure on the SCell may be aborted.

In an example, when a MAC entity is configured with an SCell associated with an SCell state set to dormant state upon the SCell configuration, or when the MAC entity receives MAC CE(s) indicating transitioning the SCell into a dormant state, the MAC entity may: transition the SCell into a dormant state; transmit one or more CSI reports for the SCell; stop an SCell deactivation timer associated with the SCell; stop an SCell hibernation timer associated with the SCell if configured; start or restart a dormant SCell deactivation timer associated with the SCell; and/or flush all HARQ buffers associated with the SCell. In an example, when the SCell hibernation timer associated with the activated SCell expires, the MAC entity may: hibernate the SCell; stop the SCell deactivation timer associated with the SCell; stop the SCell hibernation timer associated with the SCell; and/or flush all HARQ buffers associated with the SCell. In an example, when a dormant SCell deactivation timer associated with a dormant SCell expires, the MAC entity may: deactivate the SCell; and/or stop the dormant SCell deactivation timer associated with the SCell. In an example, when an SCell is in dormant state, ongoing random access procedure on the SCell may be aborted.

FIG. 22 shows DCI formats for an example of 20 MHz FDD operation with 2 Tx antennas at the base station and no carrier aggregation in an LTE system. In a NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a UE may assume no transmission is intended for the UE; DCI format 2_2 indicating transmission of TPC commands for PUCCH and PUSCH; and/or DCI format 2_3 indicating transmission of a group of TPC commands for SRS transmission by one or more UEs. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

In an example, the different types of control information correspond to different DCI message sizes. For example, supporting spatial multiplexing with noncontiguous allocation of RBs in the frequency domain may require a larger scheduling message in comparison with an uplink grant allowing for frequency-contiguous allocation only. The DCI may be categorized into different DCI formats, where a format corresponds to a certain message size and usage.

In an example, a UE may monitor one or more PDCCH candidates to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the one or more PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example, in non-DRX mode operation, a UE may monitor one or more PDCCH candidate in control resource set q according to a periodicity of $W_{PDCCH, q}$ symbols that may be configured by one or more higher layer parameters for control resource set q.

In an example, the information in the DCI formats used for downlink scheduling may be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling may be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In an example, a gNB may perform cyclic redundancy check (CRC) scrambling for a DCI, before transmitting the DCI via a PDCCH. The gNB may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 23:
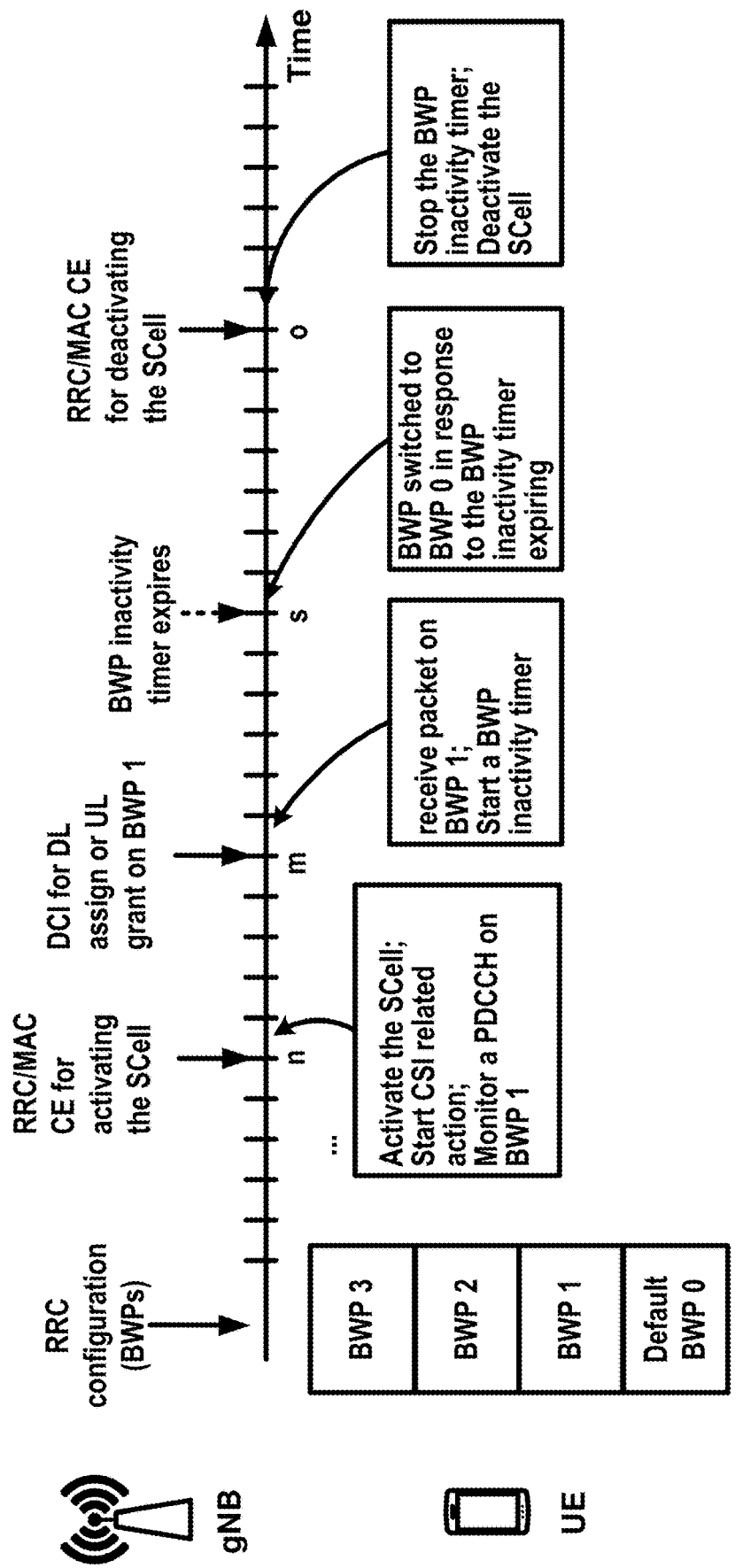
FIG. 23 is an example of BWP management on an SCell as per an aspect of an embodiment of the present disclosure.

FIG. 23 shows an example of BWP switching on an SCell. In an example, a UE may receive RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1 in FIG. 23), one BWP as the default BWP (e.g., BWP 0 in FIG. 23). The UE may receive a MAC CE to activate the SCell at $n^{th}$ slot. The UE may start a SCell deactivation timer (e.g., sCellDeactivationTimer), and start CSI related actions for the SCell, and/or start CSI related actions for the first active BWP of the SCell. The UE may start monitoring a PDCCH on BWP 1 in response to activating the SCell.

In an example, the UE may start restart a BWP inactivity timer (e.g., bwp-InactivityTimer) at $m^{th}$ slot in response to receiving a DCI indicating DL assignment on BWP 1. The UE may switch back to the default BWP (e.g., BWP 0) as an active BWP when the BWP inactivity timer expires, at $s^{th}$ slot. The UE may deactivate the SCell and/or stop the BWP inactivity timer when the sCellDeactivationTimer expires.

Employing the BWP inactivity timer may further reduce UE's power consumption when the UE is configured with multiple cells with each cell having wide bandwidth (e.g., 1 GHz). The UE may only transmit on or receive from a narrow-bandwidth BWP (e.g., 5 MHz) on the PCell or SCell when there is no activity on an active BWP.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

In an example, a base station may transmit a downlink signal/channel to a wireless device with multiple beam technologies. When applying the multiple beam technologies, the base station may indicate to the wireless device a transmission beam on which the wireless device may employ for PUCCH/PUSCH transmission. The wireless device may determine a transmission beam based on the indication. The indication may be transmitted via a DCI (e.g., DCI format 0_1) or an RRC message. The determination of the transmission beam may be referred to as a determination of a spatial domain transmission filter.

Figure 24:
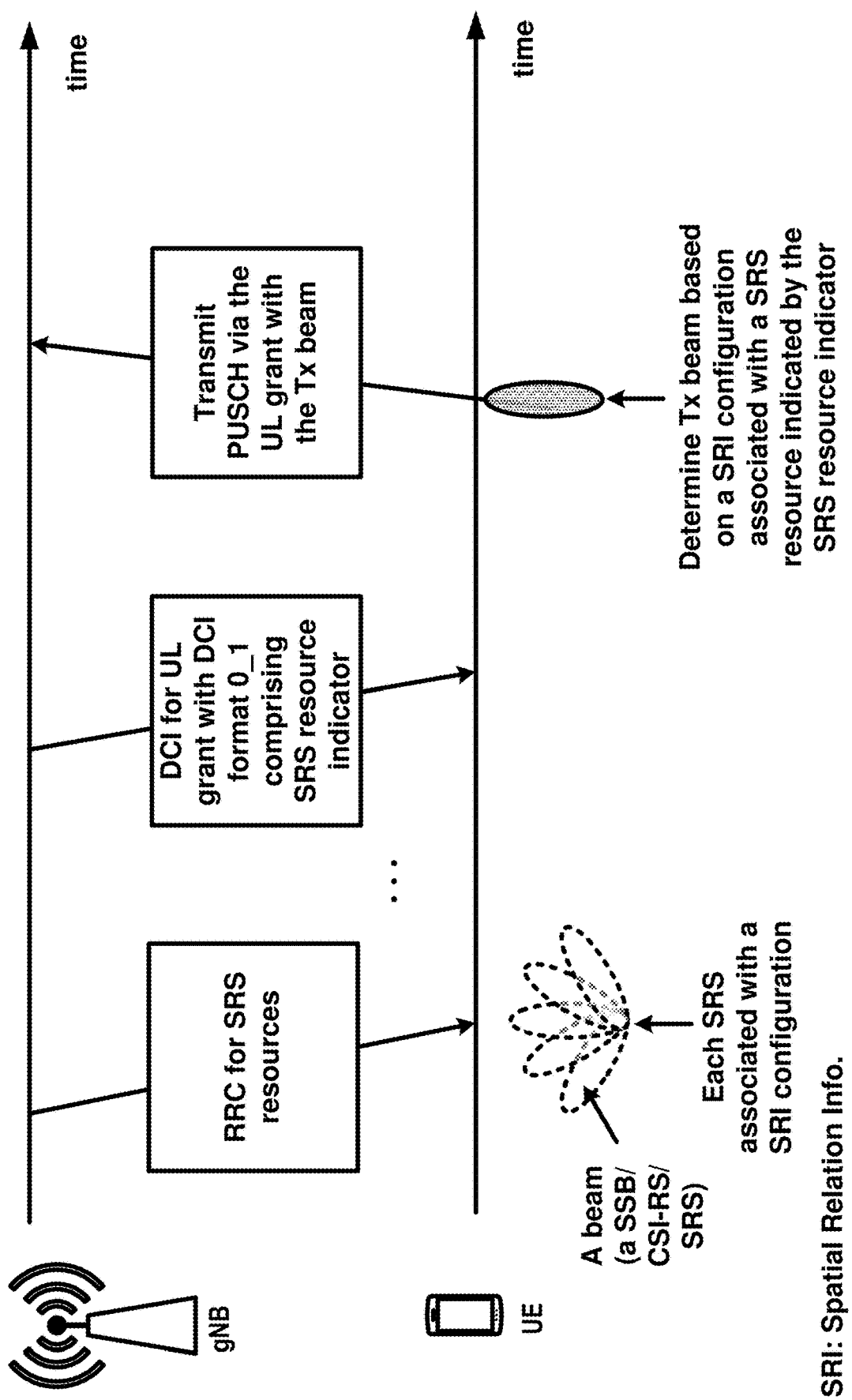
FIG. 24 is an example of transmission beam determination of a PUSCH transmission based on a DCI format 0_1 as per an aspect of an embodiment of the present disclosure.

FIG. 24 is an example of transmission beam determination of a PUSCH transmission based on a DCI format 0_1. In an example, a base station may transmit to a wireless device one or more RRC messages (e.g., ServingCellConfig, SIB1, or CellGroupConfig) comprising configuration parameters of sounding reference signal (SRS) resources. Each SRS resource may be identified with an SRS resource ID. Each SRS resource may be configured with a number of SRS ports, a transmission comb indicator, a resource mapping configuration parameter, one or more frequency location parameters, a resource type (periodic, aperiodic, semi-persistent) indicator; a sequence indicator, and/or a spatial relation information configuration. The spatial relation information configuration may indicate a reference signal resource index of a cell. The reference signal resource index may comprise an SSB index, a CSI-RS index, or an SRS index of an uplink BWP on the cell. The spatial relation information configuration of an SRS may indicate a spatial relation between the SRS and an SSB indicated by an SSB index, if a reference signal resource index of the spatial relation information configuration comprises the SSB index. The spatial relation information configuration of an SRS may indicate a spatial relation between the SRS and a CSI-RS indicated by a CSI-RS index, if a reference signal resource index of the spatial relation information configuration comprises the CSI-RS index. The spatial relation information configuration of a first SRS may indicate a spatial relation between the first SRS and a second SRS indicated by an SRS index, if a reference signal resource index of the spatial relation information configuration comprises the SRS index. In an example, the wireless device may determine a transmission beam based on a spatial relation information configuration of an SRS.

As shown in FIG. 24, the base station may transmit to the wireless device a DCI (with DCI format 0_1) indicating PUSCH resources. A DCI with the DCI format 0_1 may comprise: a carrier indicator; a BWP ID; a frequency resource assignment parameter; a time resource assignment parameter; a frequency hopping flag; an MCS indicator; a new data indicator; a redundancy version value; a HARQ process number; a first downlink assignment index; a second downlink assignment index; a TPC command for PUSCH; a UL/SUL indicator; an SRS resource indicator; a parameter indicating precoding information and number of layers; antenna ports indicator; an SRS request; a CSI request; a CBG transmission information parameter; a PTRS-DMRS association indicator; a beta offset indicator; a DMRS sequence initialization indicator; and/or a UL-SCH indicator. In response to receiving the DCI with DCI format 0_1, the wireless device may transmit an uplink transport block (TB) via the PUSCH resources with a spatial domain transmission filter based on an SRS indicated by the SRS resource indicator. In an example, if a reference signal resource index of the spatial relation information configuration of the SRS comprises an SSB index, the wireless device may transmit the uplink TB with a same spatial domain transmission filter used for reception of an SSB identified by the SSB index. In an example, if the reference signal resource index comprises a CSI-RS index, the wireless device may transmit the uplink TB with a same spatial domain transmission filter used for reception of a CSI-RS identified by the CSI-RS index. In an example, if the reference signal resource index comprises an SRS index, the wireless device may transmit the uplink TB with a same spatial domain transmission filter used for transmission of an SRS identified by the SRS index.

Figure 25:
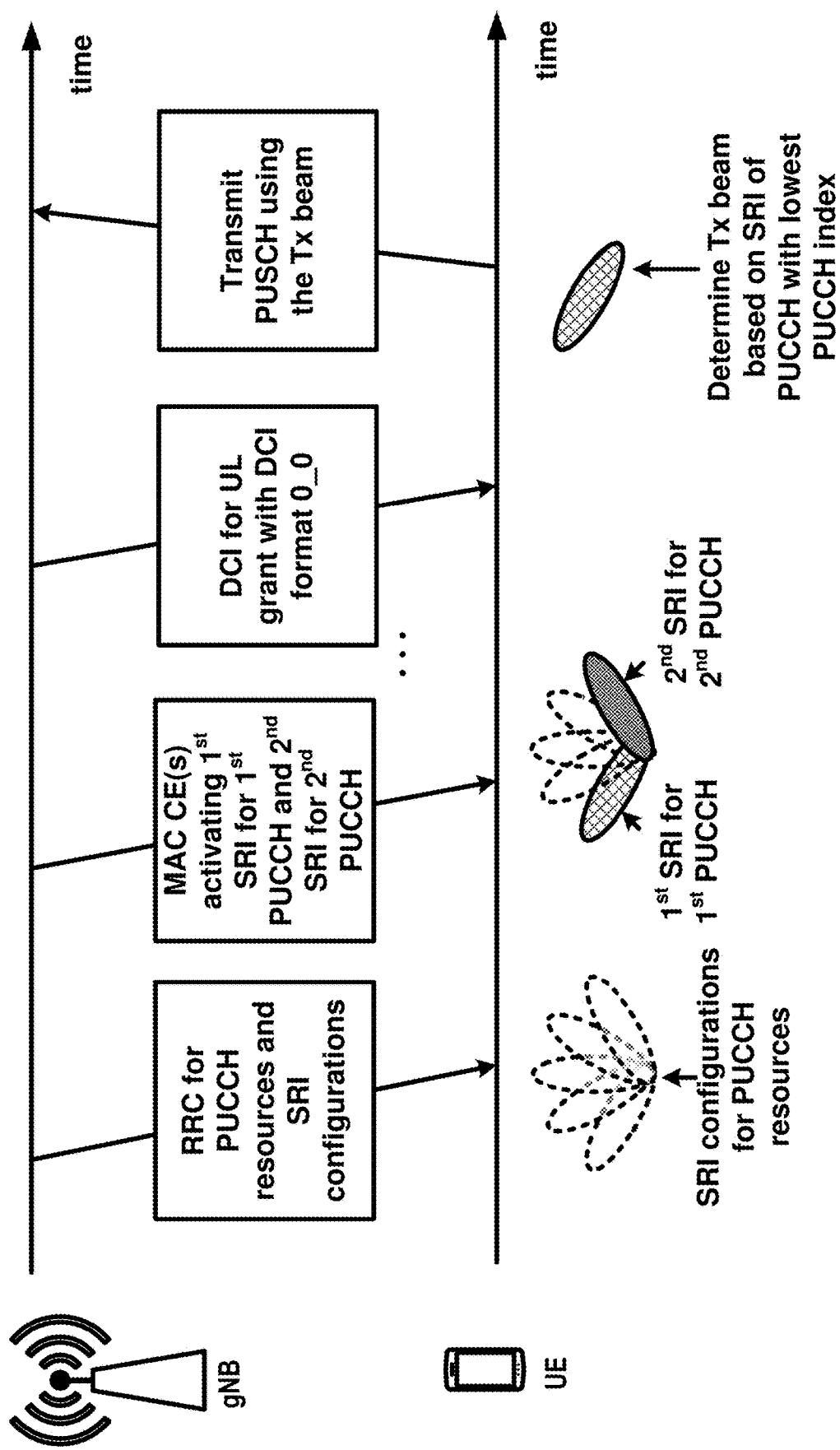
FIG. 25 is an example of transmission beam determination of a PUSCH transmission based on a DCI format 0_0 as per an aspect of an embodiment of the present disclosure.

In an example, a base station may transmit to a wireless device a DCI (e.g., DCI format 0_0) indicating an uplink grant. A DCI with DCI format 0_0 may comprise: a frequency resource assignment parameter; a time resource assignment parameter; a frequency hopping flag; an MCS indicator; a new data indicator; a redundancy version value; a HARQ process number; a TPC command for PUSCH; a UL/SUL indicator; and/or padding bits if necessary. DCI format 0_0 may be a fallback DCI, compared to DCI format 0_1. DCI format 0_0 may have a smaller number of bits than a DCI format 0_1. In an example, transmitting DCI format 0_0, rather than DCI format 0_1, may reduce signaling overhead. DCI format 0_0 may not comprise an SRS resource indicator. FIG. 25 is an example of transmission beam determination of a PUSCH transmission based on a DCI format 0_0. In an example, a base station may transmit to a wireless device one or more RRC messages (e.g., PUCCH-Config) comprise configuration parameters of a plurality of PUCCH resources and a plurality of spatial relation information configurations. In an example, each PUCCH resource may be identified by a PUCCH resource index (or ID). Each PUCCH resource may be configured with a starting physical resource block (PRB) location and a PUCCH format (e.g., PUCCH format 0, PUCCH format 1, PUCCH format 2, PUCCH format 3, and/or PUCCH format 4). In an example, each spatial relation information configuration may be identified by a spatial relation information configuration index (or ID). Parameters of each spatial relation information configuration may comprise: a serving cell ID; a reference signal resource index; a PUCCH pathloss reference RS indicator; a P0 value for PUCCH transmission; and/or a close loop power control identifier. The reference signal resource index may comprise: an SSB index, a CSI-RS index or an SRS index. In an example, a spatial relation information configuration of PUCCH may indicate spatial setting of the PUCCH transmission. The spatial relation information configuration of PUCCH may indicate power control parameters.

As shown in FIG. 25, the base station may transmit one or more MAC CEs activating a first spatial relation information configuration (from the plurality of spatial relation information configurations) for a first PUCCH resource (from the plurality of PUCCH resources). The one or more MAC CEs may activate a second spatial relation information configuration (from the plurality of spatial relation information configurations) for a second PUCCH resource (from the plurality of PUCCH resources). The one or more MAC CEs may be identified with a MAC PDU subheader with a LCID value (e.g., "110001" as shown in FIG. 18). In an example, when the wireless device transmits first UCIs via the first PUCCH resource, the wireless device, based on the first spatial relation information configuration (e.g., activated by the one or more MAC CEs), may determine a spatial domain transmission filter for the transmission. In an example, when the wireless device transmits second UCIs via the second PUCCH resource, the wireless device, based on the second spatial relation information configuration (e.g., activated by the one or more MAC CEs), may determine a spatial domain transmission filter for the transmission. In an example, if a reference signal resource index of a spatial relation information configuration activated on a PUCCH (e.g., first PUCCH or second PUCCH) comprises an SSB index, the wireless device may transmit UCIs on the PUCCH with a same spatial domain transmission filter used for reception of an SSB identified by the SSB index. In an example, if the reference signal resource index comprises a CSI-RS index, the wireless device may transmit UCIs on the PUCCH with a same spatial domain transmission filter used for reception of a CSI-RS identified by the CSI-RS index. In an example, if the reference signal resource index comprises an SRS index, the wireless device may transmit the UCIs on the PUCCH with a same spatial domain transmission filter used for transmission of an SRS identified by the SRS index.

As shown in FIG. 25, the base station may transmit to the wireless device a DCI (DCI format 0_0) indicating PUSCH resources. Since the DCI format 0_0 does not have an SRS resource indicator, the wireless device may, based on a spatial domain transmission filter of a transmission of a PUCCH, transmit an uplink TB via the PUSCH resources. In an example, the wireless device may transmit the uplink TB with a same spatial domain transmission filter used for a transmission of UCIs via a PUCCH resource with a lowest PUCCH resource index. In an example, the spatial domain transmission filter used for the transmission of the UCIs via the PUCCH resource may be determined based on a spatial relation information configuration (e.g., activated by a MAC CE) of the PUCCH resource (e.g., as described above). In an example, the PUCCH resource with the lowest PUCCH resource index may be referred to as a default PUCCH resource. In an example, the wireless device may not expect PUSCH scheduled by DCI format 0_0 without configured PUCCH resource with a spatial relation information configuration. In an example, the wireless device may not expect PUSCH scheduled by DCI format 0_0, if a spatial relation information configuration is not activated (e.g., by MAC CE) for a default PUCCH resource. By this embodiment, a base station and a wireless device may align on a transmission beam on which the wireless device transmit an uplink TB via a PUSCH resource, if the PUSCH resource is assigned in a DCI format 0_0. The base station may receive the uplink TB with a receiving beam corresponding to the transmission beam of the wireless device.

Figure 26:
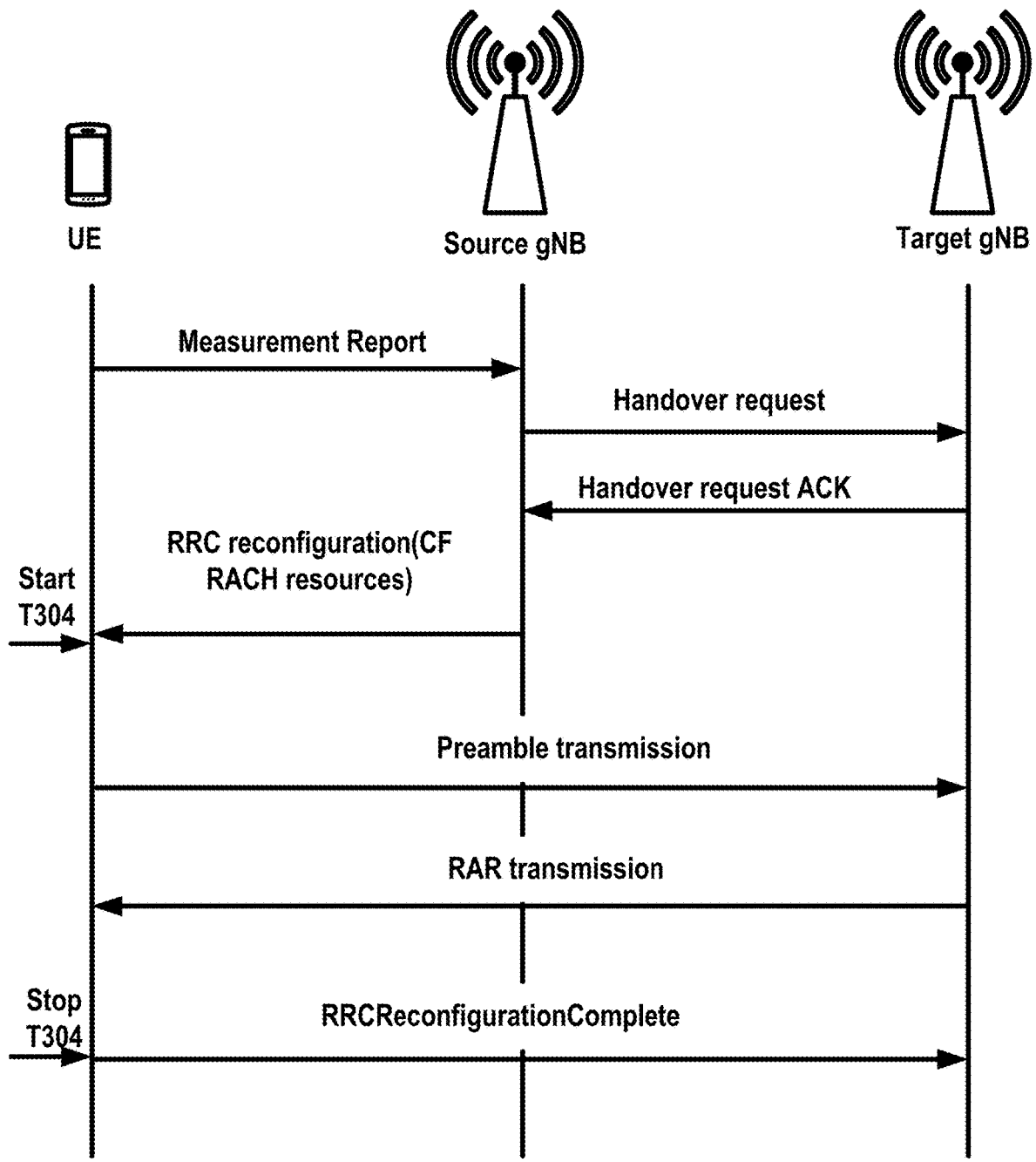
FIG. 26 is an example of a handover procedure as per an aspect of an embodiment of the present disclosure.

In an example embodiment, in RRC_CONNECTED mode, the network may control UE mobility (e.g., handover), for example, the network may decide when the UE connects to which NR cell(s) or inter-RAT cell (e.g., E-UTRA). FIG. 26 shows an example of handover from a source gNB to a target gNB for a wireless device.

In an example, for network controlled mobility in RRC_CONNECTED, the PCell may be changed using an RRC Connection Reconfiguration message (e.g., RRCReconfiguration) including reconfigurationWithSync (in NR specifications) or mobilityControlInfo in LTE specifications (handover). The SCell(s) may be changed using the RRC Connection Reconfiguration message either with or without the reconfigurationWithSync or mobilityControlInfo. The network may trigger the handover procedure e.g. based on radio conditions, load, QoS, UE category, and/or the like.

As shown in FIG. 26, the network may configure the UE to perform measurement reporting (possibly including the configuration of measurement gaps). The UE may transmit one or more measurement reports to the source gNB (or source PCell). In an example, the network may initiate handover blindly, for example without having received measurement reports from the UE. Before sending the handover message to the UE, the source gNB may prepare one or more target cells. The source gNB may select a target PCell.

As shown in FIG. 26, based on the one or more measurement reports from the UE, the source gNB may provide the target gNB with a list of best cells on each frequency for which measurement information is available, for example, in order of decreasing RSRP. The source gNB may also include available measurement information for the cells provided in the list. The target gNB may decide which SCells are configured for use after handover, which may include cells other than the ones indicated by the source gNB. In an example, as shown in FIG. 26, the source gNB may transmit a handover request to the target gNB. The target gNB may response with a handover message. In an example, in the handover message, the target gNB may indicate access stratum configuration to be used in the target cell(s) for the UE.

In an example, the source gNB may transparently (for example, does not alter values/content) forward the handover message/information received from the target gNB to the UE. In the handover message, RACH resource configuration may be configured for the UE to access a cell in the target gNB. When appropriate, the source gNB may initiate data forwarding for (a subset of) the dedicated radio bearers.

As shown in FIG. 26, after receiving the handover message, the UE may start a handover timer (e.g., T304) with an initial timer value. The handover timer may be configured in the handover message. Based on the handover message, the UE may perform downlink synchronization to the target gNB. After or in response to performing downlink synchronization to the target gNB, the UE may initiate a random access (e.g., contention-free, or contention-based) procedure attempting to access the target gNB at the available RACH occasion according to a random access resource selection, where the available RACH occasion may be configured in the RACH resource configuration. When allocating a dedicated preamble for the random access in the target gNB, RAN may ensure the preamble is available from the first RACH occasion the UE may use. In an example, as shown in FIG. 26, the UE may transmit a preamble to the target gNB via a RACH resource. The target gNB may receive the preamble transmitted from the UE. The target gNB may transmit a random access response to the UE, where the random access response comprises the preamble transmitted by the UE. In response to receiving the random access response comprising the preamble, the UE may complete the random access procedure. In response to completing the random access procedure, the UE may stop the handover timer. The UE may transmit an RRC reconfiguration complete message to the target gNB, after completing the random access procedure, or before completing the random access procedure. The UE, after completing the random access procedure towards the target gNB, may apply first parts of CQI reporting configuration, SR configuration and SRS configuration that do not require the UE to know a system frame number (SFN) of the target gNB. The UE, after completing the random access procedure towards the target PCell, may apply second parts of measurement and radio resource configuration that require the UE to know the SFN of the target gNB (e.g. measurement gaps, periodic CQI reporting, SR configuration, SRS configuration), upon acquiring the SFN of the target gNB.

Figure 27A:
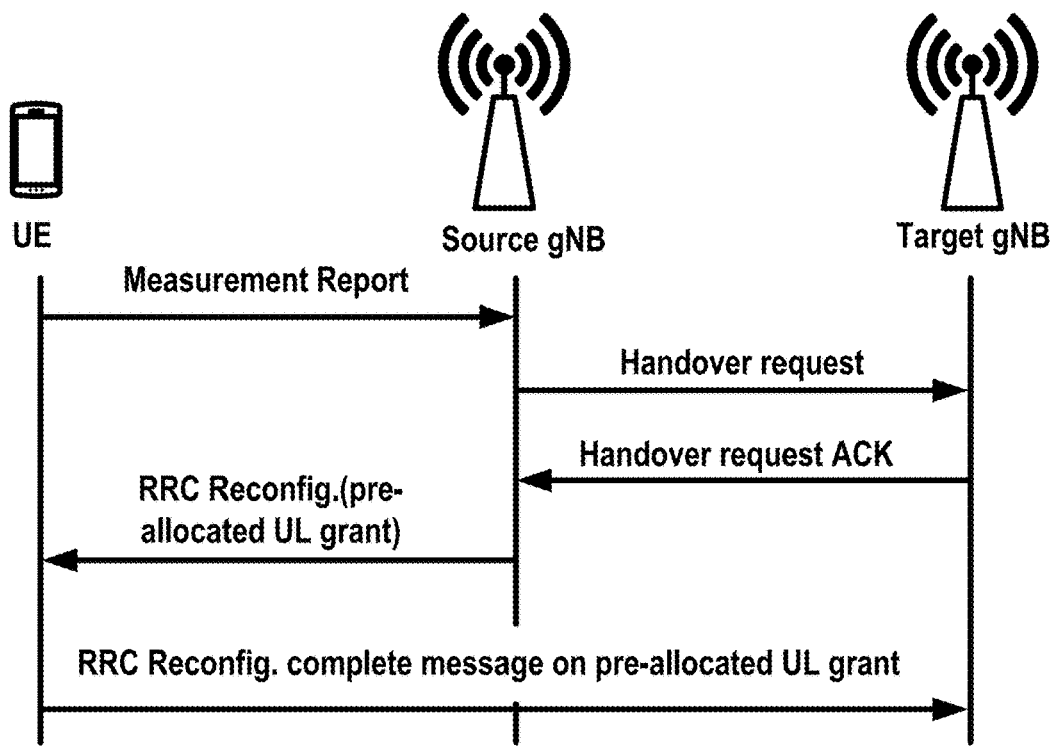
FIG. 27A and FIG. 27B are examples of RACH-less handover procedures as per an aspect of an embodiment of the present disclosure.
Figure 27B:
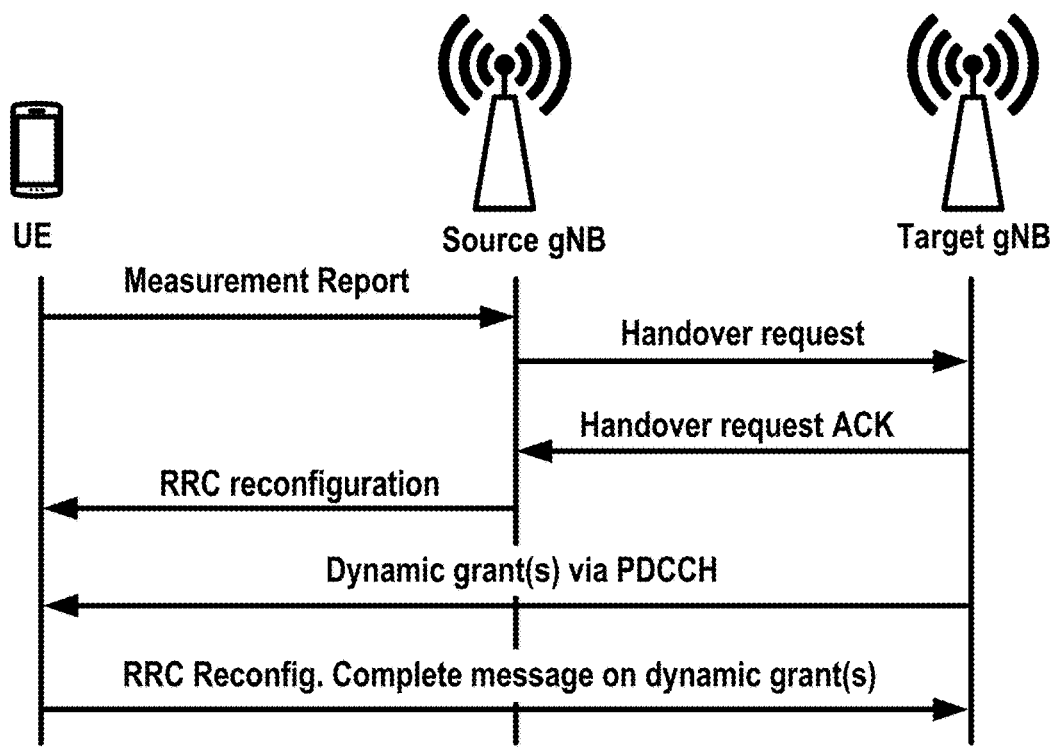

In an example, a wireless device may perform a RACH-less handover. The RACH-less handover may be employed for reducing handover latency. FIG. 27A and FIG. 27B show examples of RACH-less handover.

In an example, FIG. 27A is an example of RACH-less handover with preconfigured uplink grant. A wireless device may transmit one or more measurement reports of one or more neighbour gNBs (e.g., comprising one or more cells) to a source gNB (e.g., to a PCell of the source gNB). The one or more measurement reports may comprise one or more reference signal received power (RSRP) of one or more reference signals (e.g., SSBs/CSI-RSs) of the one or more neighbour gNBs. As shown in FIG. 27A, the one or more neighbour gNBs may comprise a target gNB. In response to receive the one or more measurement reports, the source gNB may determine which one or more of the one or more neighbour gNBs may be used for possible handover of the wireless device. In an example, the source gNB may determine the target gNB may be used for handover. The source gNB may transmit a handover request message to the target gNB. The handover request message may comprise one or more measurement reports of the target gNB. In response to receiving the handover request message, the target gNB may transmit to the source gNB a handover acknowledgement message. The handover acknowledgment message may comprise preconfigured uplink grant(s) of a cell (e.g., PCell) of the target gNB. In an example, in response to receiving the handover acknowledgement message, the source gNB may transmit to the wireless device one or more RRC reconfiguration messages (e.g., RRCReconfiguration) comprising a handover message (e.g., reconfiguration WithSync). The one or more RRC reconfiguration messages may comprise the preconfigured uplink grant(s) of the cell of the target gNB, where the preconfigured uplink grant(s) may be comprised in the handover acknowledgement message transmitted from the target gNB to the source gNB. In response to receiving the one or more RRC reconfiguration messages, the wireless device may transmit one or more RRC reconfiguration complete messages (e.g., RRCReconfigurationComplete) via one or more of the preconfigured uplink grant(s) to the target gNB. In an example, in response to receiving the one or more RRC reconfiguration complete messages, the target gNB may transmit a DCI addressed to the wireless device (e.g., a C-RNTI allocated to the wireless device in the one or more RRC reconfiguration messages). The DCI may comprise a DL assignment, or an uplink grant, with CRC scrambled by the C-RNTI. The DCI may indicate a positive acknowledgement (e.g., ACK) of reception of the one or more RRC reconfiguration complete messages. In an example, in response to receiving the DCI, the wireless device may complete the RACH-less handover.

In an example, FIG. 27B is an example of RACH-less handover with dynamic allocated uplink grant. A wireless device may transmit one or more measurement reports of one or more neighbour gNBs (e.g., comprising one or more cells) to a source gNB (e.g., to a PCell of the source gNB). The one or more measurement reports may comprise one or more reference signal received power (RSRP) of one or more reference signals (e.g., SSBs/CSI-RSs) of the one or more neighbour gNBs. As shown in FIG. 27B, the one or more neighbour gNBs may comprise a target gNB. In response to receive the one or more measurement reports, the source gNB may determine which one or more of the one or more neighbour gNBs may be used for handover. In an example, the source gNB may determine the target gNB may be used for possible handover of the wireless device. The source gNB may transmit a handover request message to the target gNB. The handover request message may comprise one or more measurement reports of the target gNB. In response to receiving the handover request message, the target gNB may transmit to the source gNB a handover acknowledgement message. The handover acknowledgment message may comprise PDCCH configurations of a cell (e.g., PCell) of the target gNB. In an example, in response to receiving the handover acknowledgement message, the source gNB may transmit to the wireless device one or more RRC reconfiguration messages (e.g., RRCReconfiguration) comprising a handover message (e.g., reconfigurationWithSync). The one or more RRC reconfiguration messages may comprise the PDCCH configurations of the cell of the target gNB, where the PDCCH configurations may be comprised in the handover acknowledgement message transmitted from the target gNB to the source gNB.

In an example, after or in response to receiving the one or more RRC reconfiguration messages, the wireless device may monitor PDCCH candidates in one or more search space sets of one or more control resource sets (CORESETs) via the cell of the target gNB. The one or more search space sets and the one or more CORESETs may be indicated in the PDCCH configurations. The wireless device, during the monitoring, may receive a first DCI addressed to the wireless device (e.g., the first DCI with CRC scrambled by a C-RNTI value, the C-RNTI value being assigned by the target gNB to the wireless device in the one or more RRC reconfiguration messages), via the cell of the target gNB. The first DCI may comprise one or more uplink grants on the cell of the target gNB. In response to receiving the first DCI, the wireless device may transmit one or more RRC reconfiguration complete messages (e.g., RRCReconfigurationComplete) via one or more of the one or more uplink grants to the target gNB. In an example, in response to receiving the one or more RRC reconfiguration complete messages, the target gNB may transmit a second DCI addressed to the wireless device (e.g., a C-RNTI allocated to the wireless device in the one or more RRC reconfiguration messages). The second DCI may comprise a DL assignment, or an uplink grant, with CRC scrambled by the C-RNTI. The second DCI may indicate a positive acknowledgement (e.g., ACK) of reception of the one or more RRC reconfiguration complete messages. In an example, in response to receiving the second DCI, the wireless device may complete the RACH-less handover.

In an example, when configured with multiple beams in high frequency (e.g., above 6 GHz), a wireless device may maintain and/or update a beam pair link with a base station for data/control transmission and reception. The beam pair link may be controlled and/or managed by the base station, for example, by indicating beam related parameters to the wireless device. The beam related parameters may be transmitted in RRC messages, MAC CEs, and/or DCIs. In an example, the beam related parameters may comprise a transmission configuration indication (TCI) parameter (e.g., TCI-state) for reception of PDCCH/PDSCH. The beam related parameter may comprise a spatial relation information (SRI) configuration (e.g., PUCCH-SpatialRelationInfo) for transmission beam determination of PUCCH. The beam related parameter may comprise an SRS resource indicator transmitted in DCI (e.g., DCI format 0_1) for transmission beam determination for PUSCH.

In an example, the base station may transmit to the wireless device a DCI with DCI format 0_0 not comprising the SRS resource indicator and the DCI indicating an uplink transmission via a PUSCH. The wireless device may determine, based on whether the wireless device is in an RRC idle state or in an RRC connected state, a transmission beam (or a spatial domain transmission filter) of the PUSCH. In some existing technologies, the wireless device, when in the RRC connected state, may determine the transmission beam of the PUSCH scheduled by DCI format 0_0, based on a reference signal associated with an SRI activated on a PUCCH resource, with lowest PUCCH resource index, of a plurality of PUCCH resources, as shown in FIG. 25. The wireless device may transmit the PUSCH with a same spatial domain transmission filter used for UCIs transmission via the PUCCH resource with lowest PUCCH resource index, if the SRI for the PUCCH resource is activated by a MAC CE before the PUSCH transmission. In some existing technologies, the wireless device, when in the RRC idle state, may determine the transmission beam of the PUSCH based on a transmission beam for a RACH preamble transmission or a Message 3 transmission in a RACH procedure. A RACH procedure may be implemented based on examples of FIG. 12.

However, when the wireless device is in the RRC connected state, the wireless device may not have an activated SRI for PUCCH resources (e.g., the PUCCH resource with lowest PUCCH resource index). In an example, the wireless device may not have the activated SRI for the PUCCH resources when the wireless device has not yet received the MAC CE activating the SRI for the PUCCH resources comprising the PUCCH resource with lowest PUCCH resource index. The wireless device may not have the activated SRI for the PUCCH resources when the wireless device is performing a RACH-less handover (e.g., based on one or more examples of FIG. 27A and/or FIG. 27B). The wireless device may not have the available or applicable SRI for the PUCCH resources when the wireless device is not configured with one or more SRI configurations (e.g., PUCCH-SpatialRelationInfo) in RRC messages. The wireless device, by implementing some existing technologies, may determine a transmission beam for the PUSCH resources based on a transmission beam of a preamble or a Msg.3 in a RACH procedure. However, the transmission beam of the preamble or the Msg. 3 may be out-of-date and may be not applicable for a PUSCH transmission when the wireless device is scheduled to transmit via the PUSCH in an RRC connected state. Transmission of the PUSCH based on the transmission beam of the preamble or the Msg. 3 may result in reduced uplink transmission throughput, and increased uplink transmission latency. In an example, when the wireless device is performing a RACH-less handover (e.g., FIG. 27A and/or FIG. 27B), the wireless device may not transmit a preamble or a Msg. 3. In such case, the wireless device, by implementing existing technologies, may not be able to determine suitable transmission beam of PUSCH.

In an example, the wireless device, by implementing some existing technologies, may determine autonomously a transmission beam for the PUSCH resources by the wireless device's implementation algorithm. However, the base station may not be aware of the beam autonomously determined by the wireless device. This may cause misalignment of a transmission beam of PUSCH (e.g., scheduled by DCI format 0_0) between the base station and the wireless device. The misalignment on the transmission beam may result in reduced uplink transmission throughput, and increased uplink transmission latency. There is a need to improve uplink transmission beam determination mechanism. Example embodiments may improve uplink transmission throughput and/or uplink transmission latency when a PUSCH is scheduled by a DCI format 0_0 and spatial relation for PUCCH are not provided for a wireless device in an RRC connected state.

One of example embodiments comprises receiving from a base station first configuration parameter of downlink RSs (e.g., SSBs and/or CSI-RSs) and a second parameter indicating a default beam is used for PUSCH. The wireless device may determine to apply the default beam in response to: the second parameter indicating the default beam is used, the DCI being of DCI format 0_0, PUCCHs not being provided with SRIs, and/or the wireless device being in the RRC connected mode. The default beam for PUSCH transmission may be associated with one of the downlink RSs. The one of the downlink RSs may be indicated in the second parameter.

Figure 28:
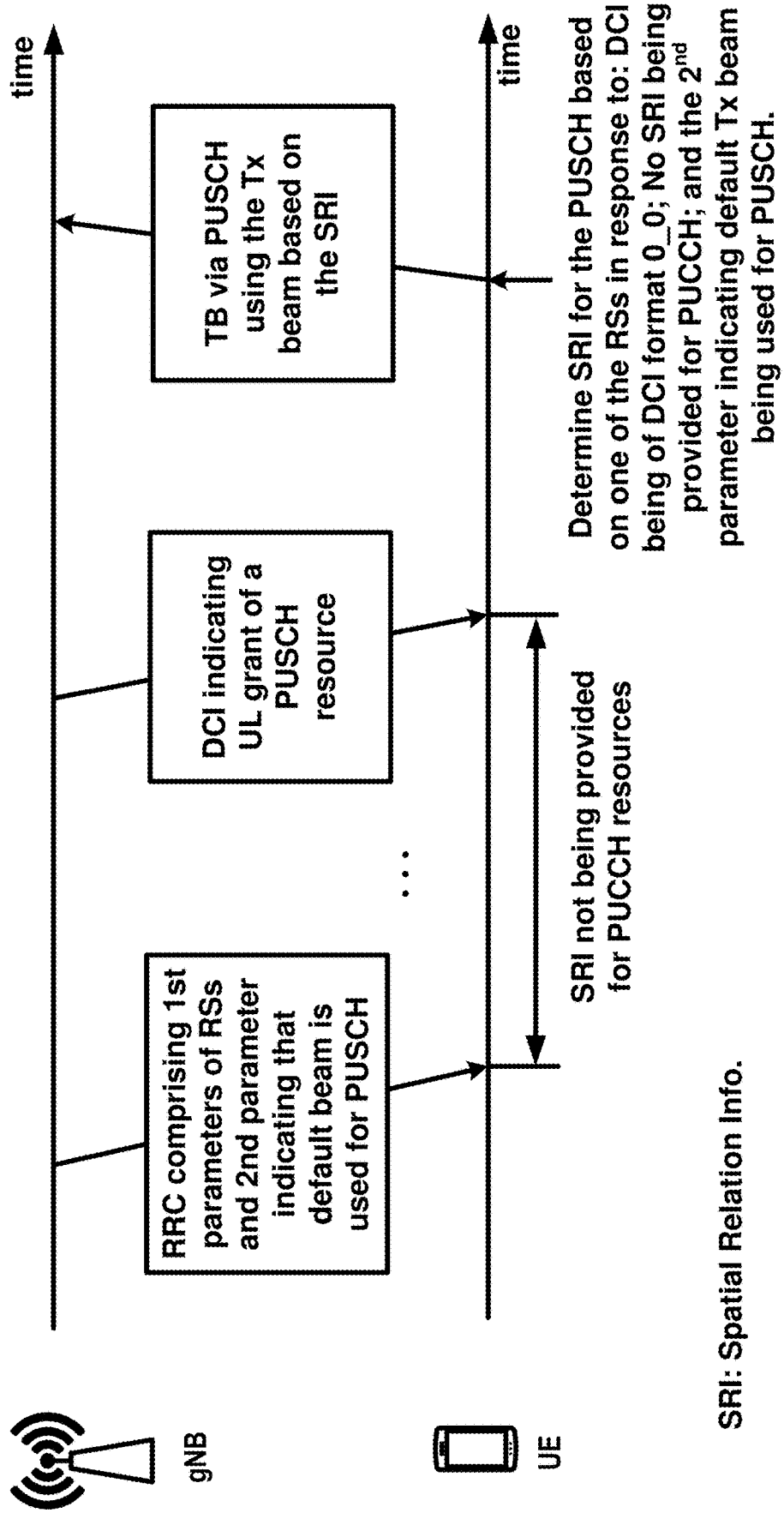
FIG. 28 is an example of uplink beam determination of PUSCH as per an aspect of an embodiment of the present disclosure.

FIG. 28 shows an example embodiment of an uplink beam determination for PUSCH. In an example, a base station may transmit to a wireless device one or more RRC messages comprising configuration parameters of a cell, the configuration parameters comprising first parameters of downlink RSs (e.g., SSBs and/or CSI-RSs) and a second parameter for PUSCH transmission beam determination. The second parameter may comprise at least one of: an indication of one of the downlink RSs, a TCI index, and/or an SRI index. In an example, the second parameter comprising the indication of the one of the downlink RSs (or the TCI index, the SRI index) may indicate that a default beam is used for the PUSCH. In an example, the second parameter not comprising the indication of the one of the downlink RSs (or the TCI index, the SRI index) may indicate that a default beam is not used for the PUSCH.

In an example, the wireless device may receive a DCI indicating an uplink grant of a PUSCH resource. The wireless device may determine a transmission beam (or a spatial domain filter) for a transmission via the PUSCH resource based on at least one of: a DCI format of the DCI, whether spatial relation for PUCCHs are provided (e.g., configured or activated) or not, whether the wireless device is in a RRC connected state or not, whether the second parameter indicates that a default beam is used for PUSCH transmission. In an example, the wireless device may determine a SRI for the PUSCH, the SRI being associated with one of the downlink RSs, in response to: the DCI format of the DCI being a DCI format 0_0 (e.g., not comprising a SRS resource indication field), the spatial relation for PUCCHs not being provided, the wireless device being in the RRC connected state and the second parameter indicating that default beam is used for PUSCH transmission. The wireless device may determine the SRI associated with a downlink RS indicated based on the second parameter. The wireless device may transmit a TB via the PUSCH resource by using a Tx beam based on the determined SRI. The wireless device may transmit, based on the determined SRI, the PUSCH with a same spatial domain filter used for receiving the downlink RS, or receiving a DMRS (e.g., for a PDCCH) QCL-ed with the downlink RS.

By implementing example embodiments, a wireless device may align with a base station on a Tx beam of a PUSCH when the PUSCH is scheduled by a DCI format 0_0 and no spatial relation information is provided (e.g., configured or activated) for PUCCH resources, and the wireless device is in an RRC connected state. Example embodiment may improve uplink transmission throughput and/or uplink transmission latency.

Figure 29:
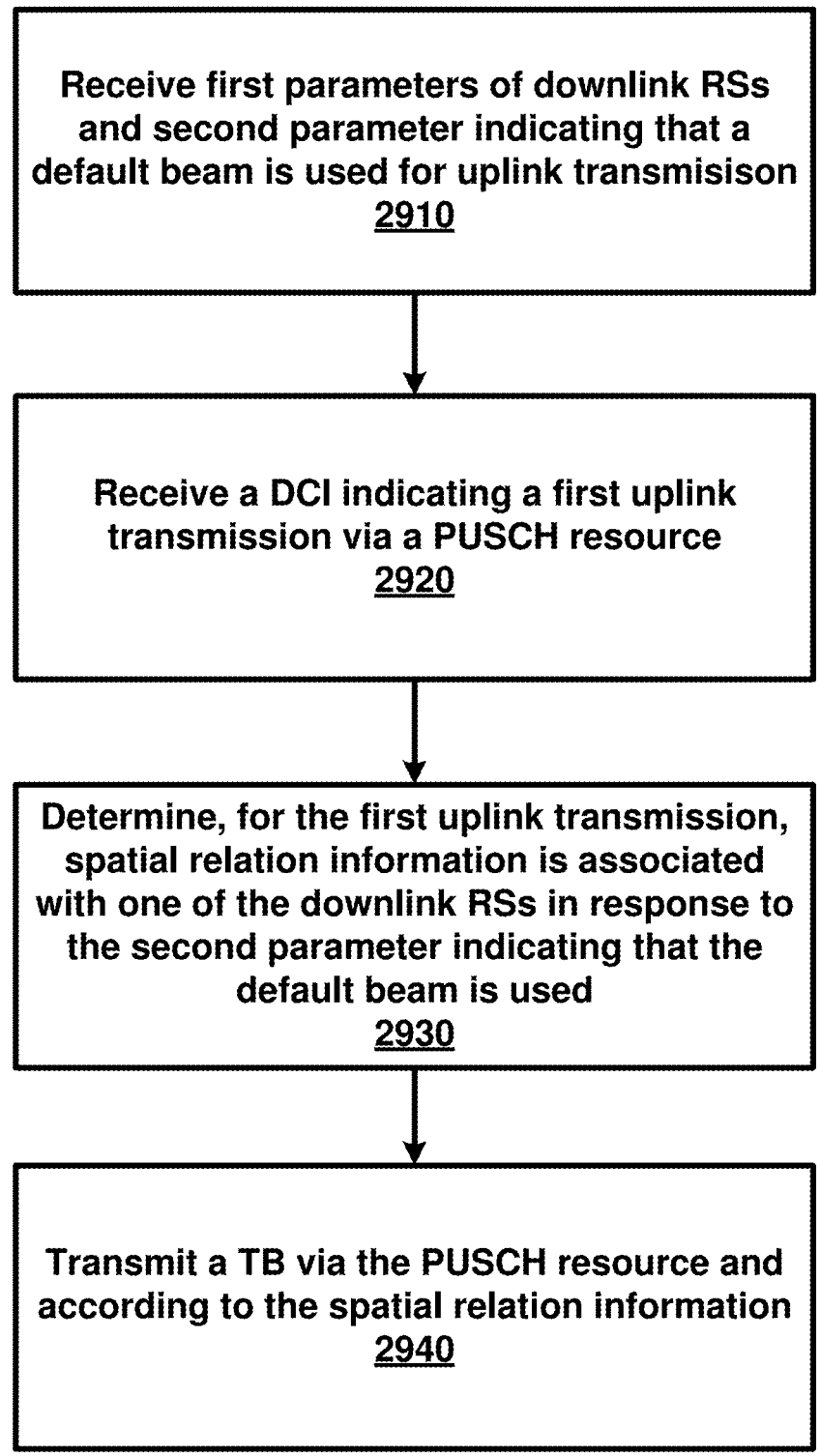
FIG. 29 is an example flowchart of uplink beam determination of PUSCH as per an aspect of an embodiment of the present disclosure.

FIG. 29 shows an example flowchart of uplink beam management. At 2910, a wireless device receives first parameters of downlink RSs and a second parameter indicating that a default beam is used for uplink transmission. At 2920, the wireless device receives a DCI indicating a first uplink transmission via a PUSCH resource. At 2930, the wireless device determines, for the first uplink transmission, spatial relation information is associated with one of the downlink RSs, in response to the second parameter indicating that the default beam is used. At 2940, the wireless device transmits a TB via the PUSCH resource and according to the spatial relation information.

According to an example embodiment, the downlink RSs comprise at least one of: one or more CSI-RSs, one or more SSBs, and/or one or more SRSs.

According to an example embodiment, the wireless device determines the spatial relation information is associated with the one of the downlink RSs further based on the DCI being of DCI format 0_0 and with an SRS resource indicator field being absent.

According to an example embodiment, the wireless device determines the spatial relation information is associated with the one of the downlink reference signals further based on one or more spatial relation information, for physical uplink control channel (PUCCH) resources, not being provided.

According to an example embodiment, the wireless device determines the spatial relation information is associated with the one of the downlink reference signals further based on the wireless device being in a radio resource control connected state.

According to an example embodiment, the wireless device initiates a handover procedure based on the wireless device being in the radio resource control connected state, wherein the handover procedure comprises at least one of: a RACH based handover to a second base station, and a RACH-less handover to the second base station.

According to an example embodiment, the wireless device transmits the transport block according to the spatial relation information comprising transmitting the transport block based on a spatial domain filter used for receiving a SSB of the downlink RSs, in response to the spatial relation information being associated with the SSB.

According to an example embodiment, the second parameter indicates the spatial relation information is associated with the SSB of the downlink reference signals.

According to an example embodiment, the wireless device receives a second DCI having a second DCI format and indicating a second PUSCH resource for a second uplink transport block, wherein the second DCI comprise an SRS resource indicator field.

According to an example embodiment, the wireless device transmits the second uplink transport block via the second PUSCH resource according to a second spatial relation information, wherein the second spatial relation information is determined based on the SRS resource indicator field in response to the second DCI comprising the SRS resource indicator field.

Figure 30:
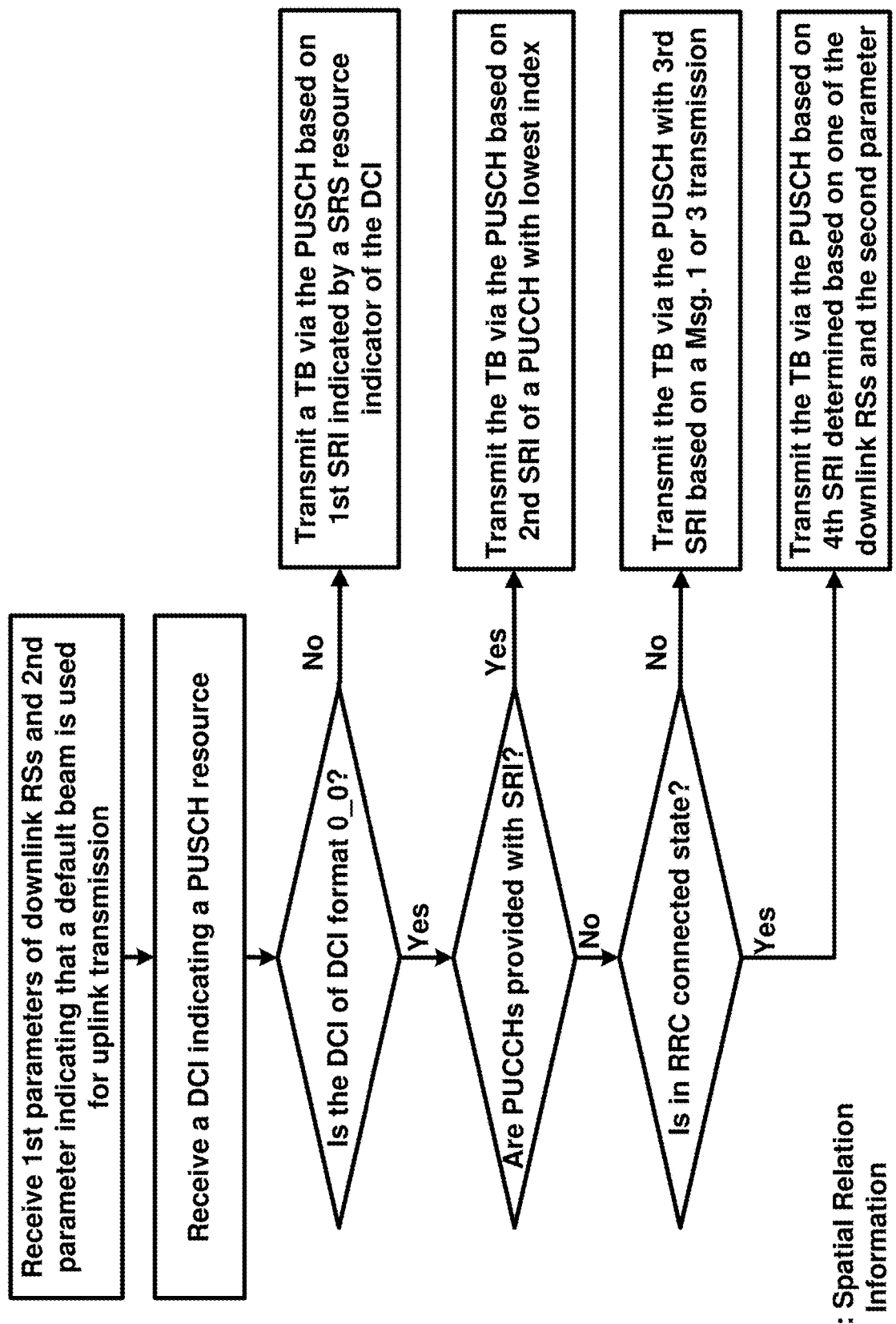
FIG. 30 is an example of flowchart of uplink beam determination of PUSCH as per an aspect of an embodiment of the present disclosure.

FIG. 30 shows an example flowchart of uplink beam determination as per an example embodiment. In an example, a wireless device may receive first parameters of downlink RSs and a second parameter indicating that a default beam is used for uplink transmission. The wireless device may receive a DCI indicating a PUSCH resource.

As shown in FIG. 30, the wireless device may determine whether the DCI is of a DCI format 0_0 (e.g., without an SRS resource indicator field in the DCI). In response to the DCI is not of the DCI format 0_0 (e.g., the DCI being of a DCI format 0_1 comprising the SRS resource indicator field), the wireless device may transmit a TB via the PUSCH resource based on a first spatial relation information indicated by the SRS resource indicator field of the DCI.

As shown in FIG. 30, when the DCI is of the DCI format 0_0, the wireless device may determine whether PUCCH resources are provided with one or more spatial relation information. In response to PUCCH resources being provided with one or more spatial relation information and the DCI being of the DCI format 0_0, the wireless device may transmit the TB via the PUSCH based on a second spatial relation information associated with a PUCCH resource, of the PUCCH resources, with a lowest PUCCH resource index.

As shown in FIG. 30, when the DCI is of the DCI format 0_0, the PUCCH resources are not provided with one or more spatial relation information, the wireless device may determine whether the wireless device is in RRC connected state. In response to the wireless device not being in RRC connected state, or in response to the wireless device being in RRC idle state, the wireless device may transmit the TB via the PUSCH with a third spatial relation information based on a transmission of a preamble, or a Msg. 3 in a RACH procedure.

As shown in FIG. 30, when the DCI is of the DCI format 0_0, the PUCCH resources are not provided with one or more spatial relation information, the wireless device is in the RRC connected state, the wireless device may transmit the TB via the PUSCH based on a fourth spatial relation information determined based on one of the downlink RSs and the second parameter indicating the default beam is used for the transmission via the PUSCH.

By example embodiment of FIG. 30, the wireless device may correctly determine a transmission beam for PUSCH based on a DCI format, SRI configuration on PUCCH resources, RRC state, and/or whether a default beam is configured for the PUSCH. Based on the specified determination method, the wireless device and the base station align on uplink transmission beam and therefore increase uplink throughput and reduce transmission latency.

In an example, the order of determining whether the DCI is DCI format 0_0, whether PUCCHs are provided with spatial relation information, and whether the wireless device is in the RRC connected state may be implemented in a different order from the one of FIG. 30. In an example, the wireless device may determine firstly whether the PUCCH resource are provided with spatial relation information, secondly determine whether the DCI is of DCI format 0_0, thirdly determine whether the wireless device is in RRC connected state. In an example, the wireless device may determine firstly whether the wireless device is in RRC connected state, secondly determine whether the DCI is of DCI format 0_0, and thirdly determine whether the PUCCH resource are provided with spatial relation information, etc. Example embodiment of FIG. 30 may improve uplink transmission throughput and transmission latency when the wireless device is in different configurations (e.g., in terms of DCI format, spatial relation configuration for PUCCH resources, RRC state, and/or RRC configuration).

In an example, a wireless device receives from a base station one or more RRC messages comprising configuration parameters of a cell, the configuration parameters comprising: first configuration parameters of downlink reference signals, and second configuration parameter indicating that a default beam is used for transmissions via a PUSCH. The wireless device receives a DCI indicating PUSCH resources for an uplink transport block. The wireless device determines, that a first spatial relation information is associated with at least one of the downlink reference signals, based on at least one of: the DCI being of DCI format 0_0, the wireless device being in a RRC connected mode, the second configuration parameter indicating that the default beam is used for transmission via the PUSCH, and spatial relation information for PUCCH resources not being provided. The wireless device transmits, via the PUSCH resources, the uplink transport block according to the first spatial relation information.

In an example, in a 4-step contention-based random access procedure, the wireless device may transmit a Msg. 3 via the PUSCH with a same transmission beam used for preamble transmission (e.g., Msg.1), or with a transmission beam same as a receiving beam for reception of RAR (e.g., scheduled by a DCI with DCI format 1_0 with CRC scrambled by RA-RNTI, where the DCI is transmitted in a common search space set). In an example, in a RACH-less handover based on dynamic grants (e.g., as shown in FIG. 27B), the wireless device may not have activated SRI for PUCCH transmission on the target gNB before the wireless device completes the RACH-less handover. In an example, in a RACH-less handover based on dynamic grants (e.g., as shown in FIG. 27B), the wireless device may not monitor a common search space set for receiving DCI format 1_0 with CRC scrambled by RA-RNTI. By implementing existing technologies, the wireless device may have difficulties in transmission beam determination for PUSCH via a cell of the target gNB, when the PUSCH is scheduled by DCI format 0_0. Incorrect determination of transmission beam for the PUSCH may result in failure of reception of the PUSCH by the target gNB, increasing latency of the RACH-less handover procedure, increasing uplink interference to the system, increasing power consumption of the wireless device. There is a need to improve existing transmission beam determination for the RACH-less handover. Example embodiments may improve the existing RACH-less handover. Example embodiments may improve channel robustness of PUSCH transmission to the target gNB, reduce latency of the RACH-less handover procedure, reduce uplink interference to the system, reduce power consumption of the wireless device, and/or improve system throughput.

Figure 31:
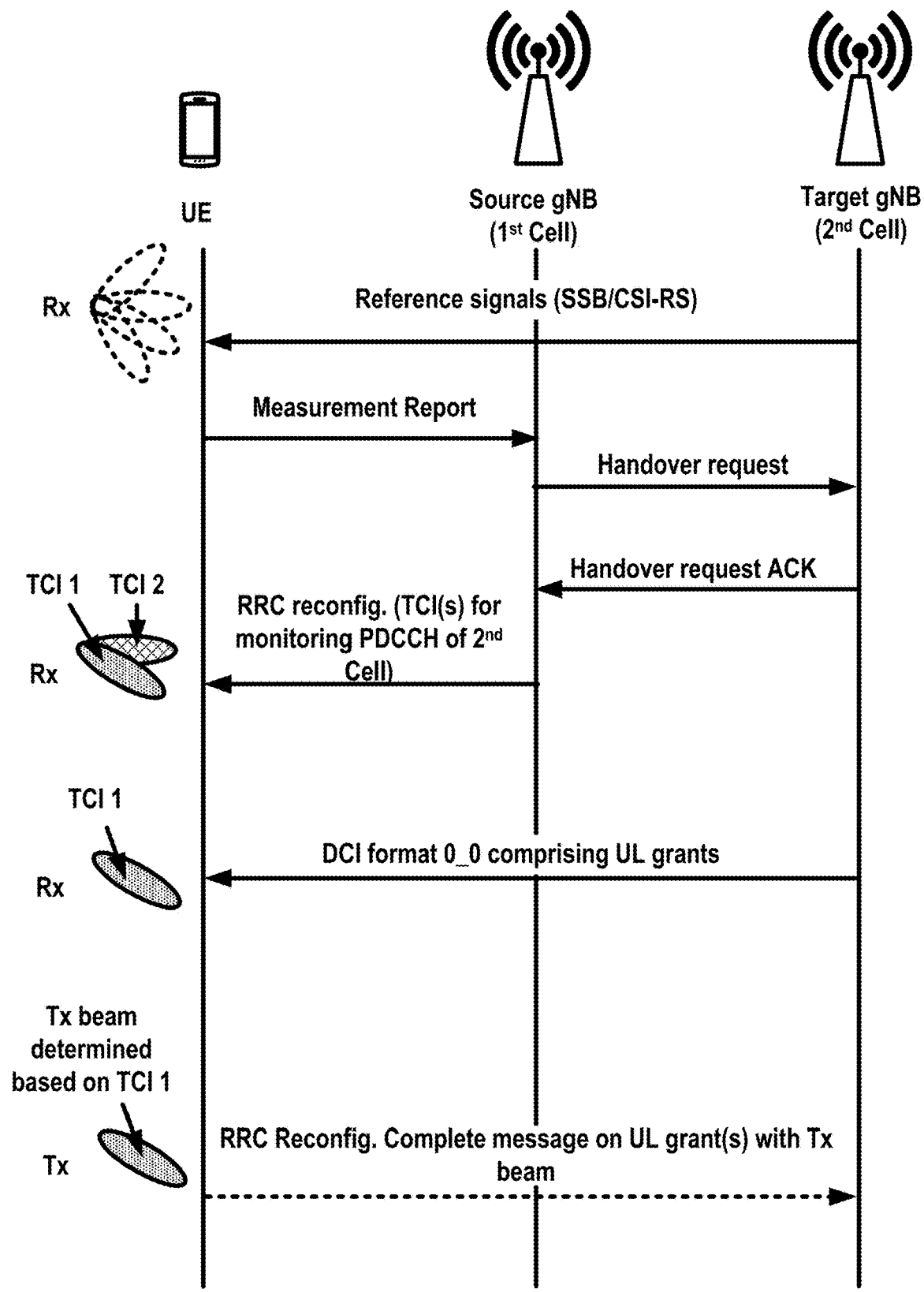
FIG. 31 is an example of transmission beam determination of a RACH-less handover procedure as per an aspect of an embodiment of the present disclosure.

FIG. 31 shows an example embodiment of improved RACH-less handover based on examples of FIG. 28, FIG. 29 and/or FIG. 30. In an example, a wireless device (e.g., UE in FIG. 31) may be in RRC-CONNECTED mode with a first cell (e.g., $1^{st}$ Cell in FIG. 31, a PCell or a SCell) of a source gNB. The wireless device may measure one or more reference signals (e.g., SSBs/CSI-RSs) transmitted from at least a second cell (e.g., $2^{nd}$ Cell in FIG. 31) of a target gNB of multiple neighbour gNBs. The wireless device may transmit one or more measurement reports of the target gNB to the source gNB. The one or more measurement reports may comprise one or more RSRP (e.g., SNR, CQI, or beam reports) of one or more reference signals (e.g., SSBs/CSI-RSs) of one or more cells of the target gNB. In response to receive the one or more measurement reports, the source gNB may determine which one or more of the multiple neighbour gNBs may be used for handover. In an example, the source gNB may determine the target gNB may be used for possible handover for the wireless device. The source gNB may transmit a handover request message to the target gNB. The handover request message may comprise one or more measurement reports of the target gNB.

In an example, in response to receiving the handover request message, the target gNB may transmit to the source gNB a handover acknowledgement message. The handover acknowledgement message may comprise PDCCH configurations of a cell (e.g., PCell) of the target gNB. In an example, parameters of the PDCCH configuration of the cell of the target gNB may comprise: one or more search space sets; one or more control resource sets; one or more TCI states. In an example, the target gNB may determine the one or more TCI states based on the measurement reports of the wireless device, e.g., a first TCI state comprising an SSB/CSI-RS index of an SSB/CSI-RS with a highest RSRP value among one or more SSBs/CSI-RSs comprised in the measurement reports, or a second TCI state comprising an SSB/CSI-RS index of an SSB/CSI-RS with a second highest RSRP value among one or more SSBs/CSI-RSs comprised in the measurement reports. In an example, the wireless device may monitor PDCCH candidates in at least one of the one or more search space sets in at least one of the one or more control resource sets with at least one of the one or more TCI states. In an example, each of the one or more TCI states may comprise at least a reference signal resource index (e.g., SSB index or CSI-RS index). In an example, when a TCI state comprises an SSB index, the wireless device may monitor PDCCH by assuming that DM-RS antenna port associated with PDCCH receptions is quasi co-located with SS/PBCH block identified by the SSB index. In an example, when a TCI state comprises a CSI-RS index, the wireless device may monitor PDCCH by assuming that DM-RS antenna port associated with PDCCH receptions is quasi co-located with CSI-RS identified by the CSI-RS index. For example, as shown in FIG. 31, the target gNB may configure one or more TCIs (e.g., TCI 1 and TCI 2) for PDCCH receptions of the wireless device.

In an example, after or in response to receiving the handover acknowledgement message, the source gNB may transmit to the wireless device one or more RRC reconfiguration messages (e.g., RRCReconfiguration) comprising a handover message (e.g., reconfigurationWithSync). The one or more RRC reconfiguration messages may comprise the PDCCH configurations of the cell of the target gNB, where the PDCCH configurations may be comprised in the handover acknowledgement message transmitted from the target gNB to the source gNB.

In an example, after or in response to receiving the one or more RRC reconfiguration messages, the wireless device may perform downlink synchronization with the cell of the target gNB. In an example, based on the performing downlink synchronization with the cell, the wireless device may monitor PDCCH candidates in one or more search space sets of one or more control resource sets (CORESETs) via the cell of the target gNB. The one or more search space sets and the one or more CORESETs may be indicated in the PDCCH configurations. The wireless device may monitor the PDCCH candidates based on TCI state configurations of the PDCCH configurations. In an example, the wireless device may monitor the PDCCH candidates by assuming that DM-RS antenna port associated with PDCCH receptions is quasi co-located with SSB or CSI-RS identified by a TCI state configured in the PDCCH configurations.

In an example, the wireless device, during the monitoring, may receive a first DCI addressed to the wireless device (e.g., the first DCI with CRC scrambled by a C-RNTI value, the C-RNTI value being assigned by the target gNB to the wireless device in the one or more RRC reconfiguration messages), via the cell of the target gNB. As shown in FIG. 31, the wireless device may receive the first DCI with a first TCI (e.g., TCI 1) of one or more TCI states configured in the PDCCH configurations. The first DCI may comprise one or more uplink grants on the cell of the target gNB. The first DCI may be transmitted with DCI format 0_0. DCI format 0_0 may not comprise an SRS resource indicator. The first DCI may be transmitted in a UE-specific search space set. The first DCI may be transmitted in a common search space set. A common search space set used for transmission of the first DCI may be associated with a CORESET with lowest CORESET index, among the one or more CORESETs. The first DCI may be transmitted with CRC scrambled by a C-RNTI value assigned by the target gNB.

In response to receiving the first DCI based on the first TCI (e.g., TCI 1 as shown in FIG. 31), the wireless device may determine a spatial domain transmission filter for PUSCH transmission based on the first TCI. In an example, the wireless device may determine the spatial domain transmission filter for the PUSCH transmission is same as a spatial domain receiving filter used for reception of the first DCI. The spatial domain receiving filter used for reception of the first DCI may be determined based on the first TCI. In an example, the wireless device may receive the DCI with the spatial domain receiving filter same as for reception of SSB or CSI RS indicated by the first TCI.

In an example, based on the determined spatial domain transmission filter, the wireless device may transmit one or more RRC reconfiguration complete messages (e.g., RRCReconfigurationComplete) via one or more of the one or more uplink grants to the target gNB. The target gNB may receive the one or more RRC reconfiguration complete messages with a receiving beam corresponding to at least one of the one or more TCI states.

In an example, in response to receiving the one or more RRC reconfiguration complete messages, the target gNB may transmit a second DCI addressed to the wireless device. The second DCI may comprise a DL assignment, or an uplink grant, with CRC scrambled by the C-RNTI. The DCI may indicate a positive acknowledgement (e.g., ACK) of reception of the one or more RRC reconfiguration messages, e.g., by toggling a new data indicator in the second DCI. In an example, in response to receiving the second DCI, the wireless device may complete the RACH-less handover.

By implementing example embodiments of FIG. 31, the wireless device may correctly determine a transmission beam based on a receiving beam of reception of a DCI from a target gNB. The base station may determine a receiving beam for reception of RRC reconfiguration complete message from the wireless device based on a transmission beam of transmission of the DCI. Example embodiments may reduce signalling overhead transmitted from the target gNB to the source gNB, and/or from the source gNB to the wireless device. Example embodiments may improve channel robustness of PUSCH transmission to the target gNB, reduce latency of the RACH-less handover procedure, reduce uplink interference to the system, reduce power consumption of the wireless device, and/or improve system throughput.

In an example, relying on a receiving beam of reception of an uplink grant DCI for determining a transmission beam for PUSCH may not be reliable, when beam correspondence is not supported by a wireless device and/or a base station. Example embodiments may improve transmission beam determination in a RACH-less handover.

Figure 32:
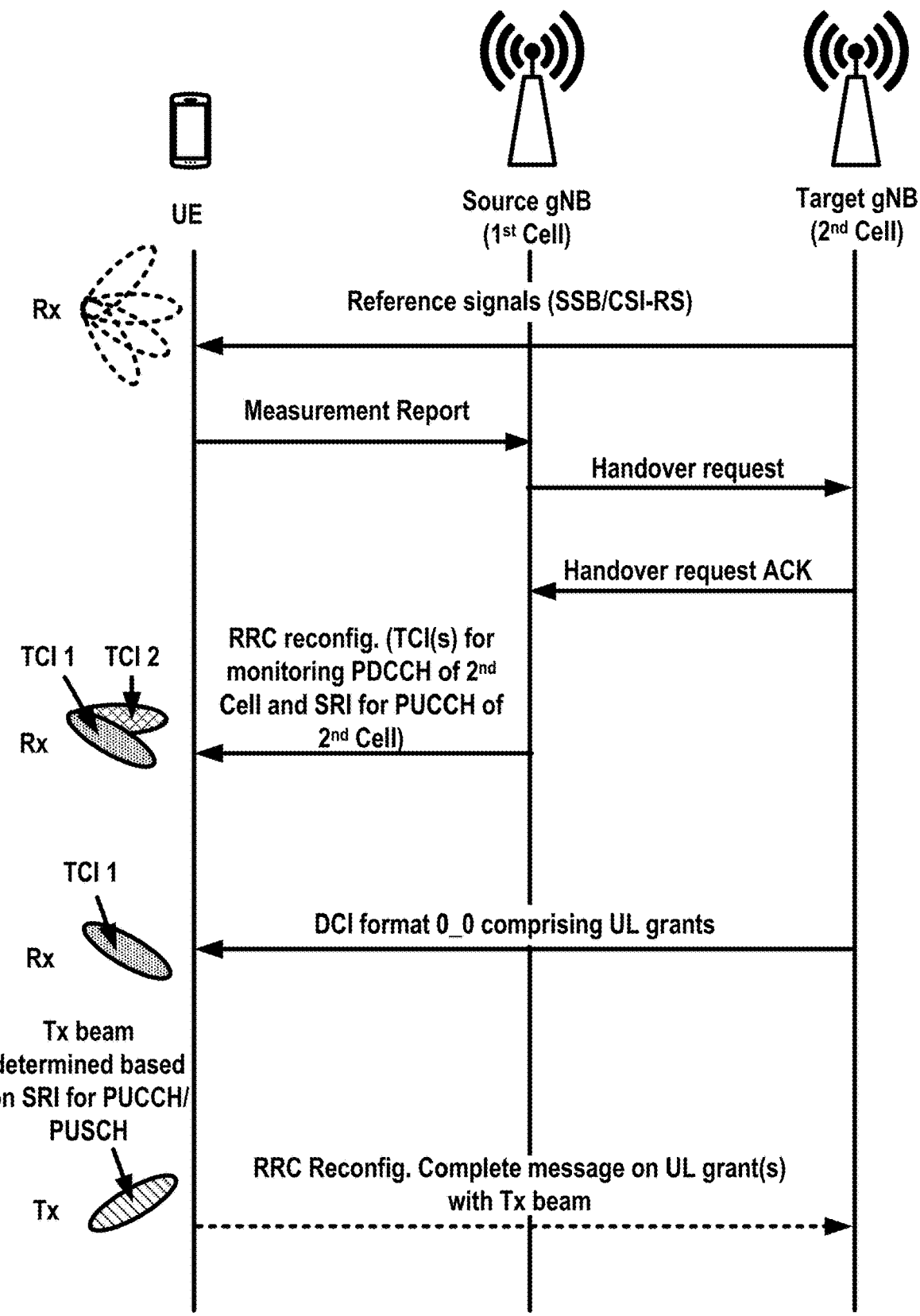
FIG. 32 is an example of transmission beam determination of a RACH-less handover procedure as per an aspect of an embodiment of the present disclosure.

FIG. 32 shows an example embodiment of an improved transmission beam determination in a RACH-less handover. In an example, a wireless device (e.g., UE in FIG. 32) may be in RRC-CONNECTED mode with a first cell (e.g., $1^{st}$ Cell in FIG. 32, a PCell or a SCell) of a source gNB. The wireless device may measure one or more reference signals (e.g., SSBs/CSI-RSs) transmitted from at least a second cell (e.g., $2^{nd}$ Cell in FIG. 32) of a target gNB of multiple neighbour gNBs. The wireless device may transmit one or more measurement reports of the target gNB to the source gNB. The one or more measurement reports may comprise one or more RSRP (e.g., SNR, CQI, or beam reports) of one or more reference signals of one or more cells of the target gNB. In response to receive the one or more measurement reports, the source gNB may determine which one or more of the multiple neighbour gNBs may be used for handover. In an example, the source gNB may determine the target gNB may be used for handover. The source gNB may transmit a handover request message to the target gNB. The handover request message may comprise one or more measurement reports of the target gNB. In response to receiving the handover request message, the target gNB may transmit to the source gNB a handover acknowledgement message.

In an example, a handover acknowledgment message may comprise PDCCH configurations of a cell (e.g., PCell) of the target gNB. In an example, parameters of the PDCCH configuration of the cell of the target gNB may comprise: one or more search space sets; one or more control resource sets; one or more TCI states. In an example, the target gNB may determine the one or more TCI states based on the measurement reports of the wireless device. In an example, the wireless device may monitor PDCCH candidates in at least one of the one or more search space sets in at least one of the one or more control resource sets with at least one of the one or more TCI states. In an example, each of the one or more TCI states may comprise at least a reference signal resource index (e.g., SSB index or CSI-RS index). In an example, when a TCI state comprises an SSB index, the wireless device may monitor PDCCH by assuming that DM-RS antenna port associated with PDCCH receptions is quasi co-located with SS/PBCH block identified by the SSB index. In an example, when a TCI state comprises a CSI-RS index, the wireless device may monitor PDCCH by assuming that DM-RS antenna port associated with PDCCH receptions is quasi co-located with CSI-RS identified by the CSI-RS index. For example, as shown in FIG. 32, the target gNB may configure one or more TCIs (e.g., TCI 1 and TCI 2) for PDCCH receptions of the wireless device.

In an example, the handover acknowledgement message may comprise configuration parameters of one or more PUCCH resources on the cell of the target gNB. In an example, a PUCCH resource may be identified by a PUCCH resource index (or ID). A PUCCH resource may be configured with a starting physical resource block (PRB) location and a PUCCH format (e.g., PUCCH format 0, PUCCH format 1, PUCCH format 2, PUCCH format 3, and/or PUCCH format 4). In an example, a PUCCH resource with lowest PUCCH resource index in the one or more PUCCH resources may be referred to as a default PUCCH resource. In an example, the default PUCCH resource may be configured with a spatial relation information (SRI) configuration. The SRI configuration, when associated with the default PUCCH resource, may be referred as a default beam, or a default SRI configuration. The default beam may be used for PUCCH and/or PUSCH. The SRI configuration may be identified by an SRI configuration index (or ID). Parameters of the SRI configuration may comprise: a serving cell ID; a reference signal resource index; a PUCCH pathloss reference RS indicator; a P0 value for PUCCH transmission; and/or a close loop power control identifier. The reference signal resource index may comprise: an SSB index, a CSI-RS index or an SRS index. In an example, the SRI configuration of the default PUCCH resource may indicate spatial setting of UCI(s) transmission via the default PUCCH resource. The SRI configuration of the default PUCCH may indicate power control parameters.

In an example, the handover acknowledgement message may comprise configuration parameters of PUSCH resources on the cell of the target gNB. In an example, the configuration parameters of the PUSCH resources on the cell of the target gNB may indicate a spatial relation information (SRI) configuration for PUSCH transmission. In an example, the SRI configuration for PUSCH transmission may be referred to a default SRI configuration (or a default transmission beam). The SRI configuration may be identified by an SRI configuration index (or ID). Parameters of the SRI configuration may comprise: a serving cell ID; a reference signal resource index; a PUSCH pathloss reference RS indicator; a P0 value for PUSCH transmission; and/or a close loop power control identifier. The reference signal resource index may comprise: an SSB index, a CSI-RS index or an SRS index. In an example, the SRI configuration of PUSCH transmission may indicate spatial setting of PUSCH transmission via a PUSCH resource.

In an example, after or in response to receiving the handover acknowledgement message, the source gNB may transmit to the wireless device one or more RRC reconfiguration messages (e.g., RRCReconfiguration) comprising a handover message (e.g., reconfigurationWithSync). In an example, the one or more RRC reconfiguration messages may comprise the PDCCH configurations of the cell of the target gNB, where the PDCCH configurations may be comprised in the handover acknowledgement message transmitted from the target gNB to the source gNB. In an example, the one or more RRC reconfiguration messages may comprise the configuration parameters of one or more PUCCH resources on the cell of the target gNB, where the configuration parameters of the one or more PUCCH resources may be comprised in the handover acknowledgement message transmitted from the target gNB to the source gNB. The configuration parameters of the one or more PUCCH resources may comprise an SRI configuration of a default PUCCH resource of the one or more PUCCH resources. In an example, the one or more RRC reconfiguration messages may comprise the configuration parameters of PUSCH resources on the cell of the target gNB, where the configuration parameters of PUSCH resources may be comprised in the handover acknowledgement message transmitted from the target gNB to the source gNB. The configuration parameters of PUSCH resources may indicate a default SRI configuration (or a default transmission beam) is used for PUSCH transmissions.

In an example, after or in response to receiving the one or more RRC reconfiguration messages, the wireless device may perform downlink synchronization with the cell of the target gNB. In an example, based on the performing downlink synchronization with the cell, the wireless device may monitor PDCCH candidates in one or more search space sets of one or more CORESETs via the cell of the target gNB. The one or more search space sets and the one or more CORESETs may be indicated in the PDCCH configurations. The wireless device may monitor the PDCCH candidates based on TCI state configurations of the PDCCH configurations. In an example, the wireless device may monitor the PDCCH candidates by assuming that DM-RS antenna port associated with PDCCH receptions is quasi co-located with SSB or CSI-RS identified by a TCI state configured in the PDCCH configurations.

In an example, the wireless device, during the monitoring, may receive a first DCI addressed to the wireless device (e.g., the first DCI with CRC scrambled by a C-RNTI value, the C-RNTI value being assigned by the target gNB to the wireless device in the one or more RRC reconfiguration messages), via the cell of the target gNB. As shown in FIG. 32, the wireless device may receive the first DCI with a first TCI (e.g., TCI 1) of one or more TCI states configured in the PDCCH configurations. The first DCI may comprise one or more uplink grants on the cell of the target gNB. The first DCI may be transmitted with DCI format 0_0. DCI format 0_0 may not comprise an SRS resource indicator. The first DCI may be transmitted in a UE-specific search space set. The first DCI may be transmitted in a common search space set. The first DCI may be transmitted in a CORESET with lowest CORESET index. The first DCI may be transmitted with CRC scrambled by a C-RNTI value assigned by the target gNB.

In response to receiving the first DCI based on the first TCI (e.g., TCI 1 as shown in FIG. 32), the wireless device may determine a spatial domain transmission filter for PUSCH transmission based on an SRI configuration of a default PUCCH resource (e.g., a PUCCH resource with a lowest PUCCH resource index in one or more PUCCH resources in the cell of the target gNB) via the cell of the target gNB. In an example, the wireless device may determine the spatial domain transmission filter for the PUSCH transmission is same as a spatial domain transmission filter used for transmission via the default PUCCH resource.

In response to receiving the first DCI based on the first TCI (e.g., TCI 1 as shown in FIG. 32), the wireless device may determine a spatial domain transmission filter for PUSCH transmission based on a default SRI configuration via the cell of the target gNB. In an example, the wireless device may determine the spatial domain transmission filter for the PUSCH transmission is same as a default SRI configuration indicated by the one or more RRC reconfiguration messages.

In an example, based on the determined spatial domain transmission filter, the wireless device may transmit one or more RRC reconfiguration complete messages (e.g., RRCReconfigurationComplete) via one or more of the one or more uplink grants to the target gNB. The target gNB may receive the one or more RRC reconfiguration complete messages with a receiving beam corresponding to at least one of the one or more TCI states. The target gNB may receive the one or more RRC reconfiguration complete messages with a receiving beam corresponding to an SRI configured for the default PUCCH, or a default SRI configured for PUSCH transmissions.

In an example, in response to receiving the one or more RRC reconfiguration complete messages, the target gNB may transmit a second DCI addressed to the wireless device. The second DCI may comprise a DL assignment, or an uplink grant, with CRC scrambled by the C-RNTI. The DCI may indicate a positive acknowledgement (e.g., ACK) of reception of the one or more RRC reconfiguration messages, e.g., by toggling a new data indicator in the second DCI. In an example, in response to receiving the second DCI, the wireless device may complete the RACH-less handover.

By implementing example embodiments of FIG. 32, the wireless device may correctly determine a transmission beam based on a configured SRI (e.g., for a default PUCCH, or for PUSCH) from a target gNB. The base station may determine a receiving beam for reception of RRC reconfiguration complete message from the wireless device based on the configured SRI. Example embodiments may improve channel robustness of PUSCH transmission to the target gNB, reduce latency of the RACH-less handover procedure, reduce uplink interference to the system, reduce power consumption of the wireless device, and/or improve system throughput.

In an example, when performing a RACH-less handover, a wireless device may not receive a DCI for uplink grant. Without mechanism controlling how long the wireless device may keep monitoring PDCCH of the target gNB, it may be possible that the wireless device may lost connection with a source gNB and/or a target gNB. There is a need to improve latency of RACH-less handover for improve latency of the handover procedure in case when the wireless device does not receive the DCI. Example embodiments may improve latency of the RACH-less handover. Example embodiments may reduce connection interruption in the RACH-less handover.

Figure 33:
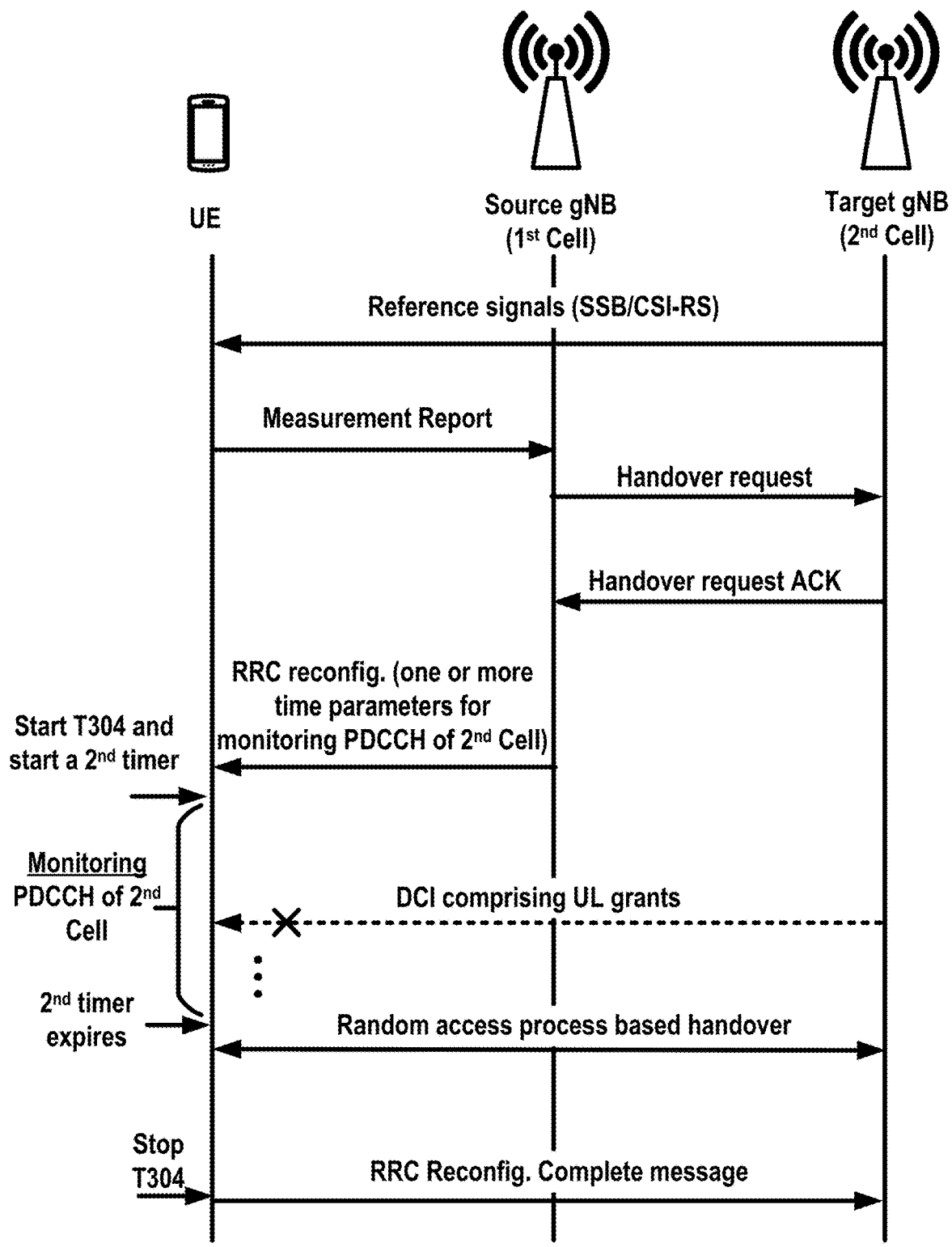
FIG. 33 is an example of RACH-less handover procedures as per an aspect of an embodiment of the present disclosure.

FIG. 33 shows an example embodiment of an improved RACH-less handover. In an example, a wireless device (e.g., UE in FIG. 33) may be in RRC-CONNECTED mode with a first cell (e.g., $1^{st}$ Cell in FIG. 33, a PCell or a SCell) of a source gNB. The wireless device may measure one or more reference signals (e.g., SSBs/CSI-RSs) transmitted from at least a second cell (e.g., $2^{nd}$ Cell in FIG. 33) of a target gNB of multiple neighbour gNBs. The wireless device may transmit one or more measurement reports of the target gNB to the source gNB. The one or more measurement reports may comprise one or more RSRP (e.g., SNR, CQI, or beam reports) of one or more reference signals of one or more cells of the target gNB. In response to receive the one or more measurement reports, the source gNB may determine which one or more of the multiple neighbour gNBs may be used for handover. In an example, the source gNB may determine the target gNB may be used for handover. The source gNB may transmit a handover request message to the target gNB. The handover request message may comprise one or more measurement reports of the target gNB. In response to receiving the handover request message, the target gNB may transmit to the source gNB a handover acknowledgement message.

In an example, a handover acknowledgement message may comprise configuration parameters of PDCCH configurations on a cell of the target gNB. In an example, a handover acknowledgment message may comprise a first timer (e.g., T304) with a first timer value and a second timer with a second timer value. The first timer may be used to control a time duration of the handover procedure. The second timer may be used to control a time duration during which the wireless may monitor PDCCH for a DCI indicating uplink grant(s) via a cell of a target gNB.

In an example, after or in response to receiving the handover acknowledgement message, the source gNB may transmit to the wireless device one or more RRC reconfiguration messages (e.g., RRCReconfiguration) comprising a handover message (e.g., reconfigurationWithSync). The wireless device may start the first timer with the first timer value and the second timer with the second timer value.

In an example, after or in response to receiving the one or more RRC reconfiguration messages, the wireless device may perform downlink synchronization with the cell of the target gNB. In an example, based on the performing downlink synchronization with the cell, the wireless device may monitor PDCCH candidates in one or more search space sets of one or more CORESETs via the cell of the target gNB. The one or more search space sets and the one or more CORESETs may be indicated in the PDCCH configurations.

In an example, the wireless device may monitor the PDCCH candidates when the first timer and/or the second timer are running.

In an example, the wireless device may receive a DCI from the cell of the target gNB, when the first timer and/or the second timer are running. In response to receiving the DCI, the wireless device may stop the second timer. In response to receiving the DCI, the wireless device may keep the first timer running. The wireless device may transmit one or more RRC reconfiguration complete messages via uplink grants indicated by the DCI, to the target gNB.

In an example, the wireless device, when the second timer expires, may not receive a DCI addressed to the wireless device (e.g., the DCI with CRC scrambled by a C-RNTI value, the C-RNTI value being assigned by the target gNB to the wireless device in the one or more RRC reconfiguration messages), via the cell of the target gNB. In response to not receiving the DCI when the second timer expires, the wireless device may switch to a random access (e.g., 2-step RACH, contention-free and/or a contention-based 4-step RACH) based handover procedure from the RACH-less handover procedure. The wireless device may keep the first timer running, in response to not receiving the DCI.

In an example, in response to switching to the random access based handover procedure, the wireless device may select a RACH occasion based on one or more reference signals of the cell on the target gNB. The wireless device may transmit a preamble (e.g., indicated in the one or more RRC reconfiguration messages, or selected by the wireless device) via the RACH occasion to the target gNB. The random access based handover may be implemented based on example embodiments of FIG. 26.

By implementing example embodiments of FIG. 33, the wireless device may switch from a RACH-less handover to a RACH-based handover based on one or more timers. Example embodiments may improve latency of the RACH-less handover. Example embodiments may reduce connection interruption in the RACH-less handover.

In an example, a wireless device may transmit to a first base station, one or more measurement reports of a cell of a second base station. The wireless device may receive from the first base station, one or more RRC reconfiguration messages comprising a configuration parameter of a spatial relation information associated with the cell. The wireless device may receive, via a downlink control channel of the cell, a downlink control information with a fallback downlink control information format (e.g., DCI format 0_0). In an example, the downlink control information indicates uplink radio resources on the cell. The wireless device may transmit, based on the downlink control information and the spatial relation information, an uplink transport block via the uplink radio resources. In an example, the spatial relation information may be configured for a physical uplink control channel of the cell. In an example, the first base station may receive the one or more RRC reconfiguration messages from the second base station. In an example, the one or more RRC reconfiguration messages may comprise configuration parameters of the cell. In an example, the one or more RRC reconfiguration messages may be comprised in a handover command.

In an example, a wireless device may transmit to a first base station, one or more measurement reports of a second base station. The wireless device may receive, from the first base station, one or more RRC reconfiguration messages comprising configuration parameters of the second base station. The wireless device may determine, based on the configuration parameters, a spatial filter parameter for monitoring a downlink control channel on the cell. The wireless device may monitor, based on the spatial filter parameter, a downlink control channel on the cell for a downlink control information. The wireless device may receive the downlink control information with a fallback downlink control information format (e.g., DCI format 0_0). In an example, the downlink control information indicates an uplink grant on the cell. The wireless device may transmit, in response to the downlink control information and based on the spatial filter parameter, an uplink transport block via the uplink grant on the cell.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMath-Script. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, configuration parameters comprising:
      first parameters of downlink reference signals; and
      a second parameter indicating that a default beam is used for uplink transmission;
   receiving a downlink control information (DCI) indicating a first uplink transmission via a physical uplink shared channel (PUSCH) resource;
   determining, for the first uplink transmission, a spatial relation information is associated with one of the downlink reference signals in response to the second parameter indicating that the default beam is used; and transmitting a transport block via the PUSCH resource and according to the spatial relation information.

2. The method of claim 1, wherein the downlink reference signals comprise at least one of:
one or more channel state information reference signals (CSI-RSs);
one or more synchronization signal blocks (SSBs); and
one or more sounding reference signals (SRSs).

3. The method of claim 1, wherein the determining the spatial relation information is associated with the one of the downlink reference signals is based on the DCI being of DCI format 0_0 and with an SRS resource indicator field being absent.

4. The method of claim 1, wherein the determining the spatial relation information is associated with the one of the downlink reference signals is based on one or more spatial relation information, for physical uplink control channel (PUCCH) resources, not being provided.

5. The method of claim 1, wherein the determining the spatial relation information is associated with the one of the downlink reference signals is based on the wireless device being in a radio resource control connected state.

6. The method of claim 5, further comprising initiating a handover procedure based on the wireless device being in the radio resource control connected state, wherein the handover procedure comprises at least one of:
a random access (RACH) based handover to a second base station; and
a RACH-less handover to the second base station.

7. The method of claim 1, wherein the transmitting the transport block according to the spatial relation information comprises: transmitting the transport block, based on a spatial domain filter used for receiving a SSB of the downlink reference signals, in response to the spatial relation information being associated with the SSB.

8. The method of claim 7, wherein the second parameter further indicates the spatial relation information is associated with the SSB of the downlink reference signals.

9. The method of claim 1, further comprising receiving a second DCI having a second DCI format and indicating a second PUSCH resource for a second uplink transport block, wherein the second DCI comprises an SRS resource indicator field.

10. The method of claim 9, further comprising transmitting the second uplink transport block via the second PUSCH resource according to a second spatial relation information, wherein the second spatial relation information is determined based on the SRS resource indicator field in response to the second DCI comprising the SRS resource indicator field.

11. A wireless device comprising:
one or more processors; and
memory storing instructions that, when executed by the one or more processors, cause the wireless device to:
receive, from a base station, configuration parameters comprising:
first parameters of downlink reference signals; and
a second parameter indicating that a default beam is used for uplink transmission;
receive a downlink control information (DCI) indicating a first uplink transmission via a physical uplink shared channel (PUSCH) resource;
determine, for the first uplink transmission, a spatial relation information is associated with one of the downlink reference signals in response to the second parameter indicating that the default beam is used; and transmit a transport block via the PUSCH resource and according to the spatial relation information.

12. The wireless device of claim 11, wherein the downlink reference signals comprise at least one of:
one or more channel state information reference signals (CSI-RSs);
one or more synchronization signal blocks (SSBs); and
one or more sounding reference signals (SRSs).

13. The wireless device of claim 11, wherein the instructions further cause the wireless device to determine the spatial relation information is associated with the one of the downlink reference signals based on the DCI being of DCI format 0_0 and with an SRS resource indicator field being absent.

14. The wireless device of claim 11, wherein the instructions further cause the wireless device to determine the spatial relation information is associated with the one of the downlink reference signals based on one or more spatial relation information, for physical uplink control channel (PUCCH) resources, not being provided.

15. The wireless device of claim 11, wherein the instructions further cause the wireless device to determine the spatial relation information is associated with the one of the downlink reference signals based on the wireless device being in a radio resource control connected mode.

16. The wireless device of claim 11, wherein to transmit the transport block according to the spatial relation information, the wireless device is further caused to: transmit the transport block, based on a spatial domain filter used for receiving a SSB of the downlink reference signals, in response to the spatial relation information being associated with the SSB.

17. The wireless device of claim 16, wherein the second parameter further indicates the spatial relation information is associated with the SSB of the downlink reference signals.

18. The wireless device of claim 11, wherein the instructions further cause the wireless device to receive a second DCI having a second DCI format and indicating a second PUSCH resource for a second uplink transport block, wherein the second DCI comprises an SRS resource indicator field.

19. The wireless device of claim 18, wherein the instructions further cause the wireless device to transmit the second uplink transport block via the second PUSCH resource according to a second spatial relation information, wherein the second spatial relation information is determined based on the SRS resource indicator field in response to the second DCI comprising the SRS resource indicator field.

20. A system comprising:
a base station comprising:
one or more first processors; and
first memory storing second instructions that, when executed by the one or more first processors, cause the base station to:
transmit configuration parameters comprising:
first parameters of downlink reference signals; and;
a second parameter indicating that a default beam is used for uplink transmission;
transmit a downlink control information (DCI) indicating a first uplink transmission via a physical uplink shared channel (PUSCH) resource; and
a wireless device comprising:
one or more second processors; and
second memory storing second instructions that, when executed by the one or more second processors, cause the wireless device to:

receive, from the base station, the configuration parameters;
receive the DCI indicating the first uplink transmission via the PUSCH resource;
determine, for the first uplink transmission, a spatial relation information is associated with one of the downlink reference signals in response to the second parameter indicating that the default beam is used; and
transmit a transport block via the PUSCH resource and according to the spatial relation information.

* * * * *